(12) United States Patent
Kimura et al.

(10) Patent No.: US 6,188,522 B1
(45) Date of Patent: Feb. 13, 2001

(54) PROJECTION LENS AND PROJECTOR USING THE SAME

(75) Inventors: Syunsuke Kimura, Nishinomiya; Masayuki Takahashi, Ibaraki, both of (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/412,461

(22) Filed: Oct. 4, 1999

(30) Foreign Application Priority Data

Sep. 24, 1999 (JP) .................................................. 11-271046

(51) Int. Cl.[7] .............................. G02B 3/00; G02B 25/00
(52) U.S. Cl. ......................... 359/649; 359/650; 359/651; 359/643
(58) Field of Search .................................... 359/649, 650, 359/651, 663, 643, 689, 690, 686, 687

(56) References Cited

U.S. PATENT DOCUMENTS 5,905,596   5/1999   Watanabe .

6,075,653 * 6/2000  Narimatsu ............................ 359/686

FOREIGN PATENT DOCUMENTS 385 698   9/1990   (EP) .

* cited by examiner

*Primary Examiner*—Georgia Epps
*Assistant Examiner*—Michael A Lucas
(74) *Attorney, Agent, or Firm*—Merchant & Gould P.C.

(57) ABSTRACT

The present invention provides a projection lens for projecting light from a light source onto a screen to form a magnified image, including two joined lenses, each of which includes a negative lens and a positive lens. The difference in the refractive index and the Abbe number between the negative lens and the positive lens in each of the joined lenses and the partial dispersion ratio of the negative lens and the positive lens of the second joined lens are specified. Thus, a large angle of view and a long back focal length can be achieved while satisfying distortion aberrations, telecentric properties and magnification chromatic aberrations.

19 Claims, 28 Drawing Sheets

PROJECTION LENS AND PROJECTOR USING THE SAME

BACKGROUND OF THE INVENTION

1. Field of the Invention

The present invention relates to a projection lens, in particular, a projection lens for a projector that projects an image in a spatial optical modulator onto a screen in a larger size.

2. Description of the Prior Art

The following method conventionally is known to obtain large screen images. An optical image corresponding to an image signal is formed in a spatial optical modulator, and the optical image is irradiated with light so that the image is projected in a larger size onto a screen with a projection lens. Recently, a projector using a liquid crystal panel as the spatial optical modulator has been receiving attention. A projector using a reflection type liquid crystal panel as the spatial optical modulator can direct illumination light from a light source toward a projection lens more effectively.

As a method for obtaining color images, the following methods are known: a method where three liquid crystal panels corresponding to image signals of R (red), G (green) and B (blue) are used, and a dichroic prism is used to synthesize the images of the three liquid crystal panels; and a method where light from a light source is divided into R, G, and B based on the time.

The projector using a prism requires a large space between the lens and the spatial optical modulator, so that the projection lens is required to have a long back focal length.

The projector using a prism has large dependence on the angle of incidence from the prism. Therefore, the transmittance of a light ray that is incident at an angle other than a designated angle of incidence is changed, thus resulting in non-uniformity in color and brightness. Therefore, the projection lens requires telecentric properties.

In a projector for data display or graphics display that strictly requires high performance at the periphery of a screen, it is important to eliminate the distortion of the outlines of graphics or blur of colors. To meet this end, it is necessary to correct the distortion aberration and the magnification chromatic aberration sufficiently.

Brightness is required at the periphery, so that the light quantity ratio at the periphery is required to be 70% or more.

Japanese Laid-Open Patent Publication (Tbkkai-Hei) No. 2-228620 discloses a projection lens having a long back focal length and telecentric properties, where distortion aberrations are corrected. However, the following problem is caused.

The projection lens shown in the examples in this publication has a small half angle of view of 36°, so that the size of the set is too large to be used as a projection television set.

SUMMARY OF THE INVENTION

Therefore, with the foregoing in mind, it is an object of the present invention to provide a projection lens where the magnification chromatic aberration is corrected sufficiently, which is required strictly, especially for a lens for projection, by optimizing the lens configuration, and that can realize high quality images throughout a screen.

The present invention has achieved a projection lens that has a short projection distance and a long back focal length, and provides images with reduced blur of colors and distortion by optimizing the lens configuration, and thus achieved the above-described object.

More specifically, the projection lens of the present invention has the following features.

A projection lens according to a first embodiment of the present invention is a projection lens for projecting light from a light source onto a screen to form a magnified image, comprising two joined lenses, each of which includes a negative lens and a positive lens, and satisfying the following requirements:

(1) $-0.04 < ndI1 - ndI2 < -0.003$
(2) $13.9 < vdI1 - vdI2 < 31$
(3) $-0.039 < ndII1 - ndII2 < 0.001$
(4) $0.8 < vdII1 - vdII2 < 11.5$
(5) $-0.033 < PgFII1 - PgFII2 < -0.009$ where $ndI1$ represents the refractive index of the negative lens of the first joined lens;

$ndI2$ represents the refractive index of the positive lens of the first joined lens;

$vdI1$ represents the Abbe number of the negative lens of the first joined lens;

$vdI2$ represents the Abbe number of the positive lens of the first joined lens;

$ndII1$ represents the refractive index of the positive lens of the second joined lens;

$ndII2$ represents the refractive index of the negative lens of the second joined lens;

$vdII1$ represents the Abbe number of the positive lens of the second joined lens;

$vdII2$ represents the Abbe number of the negative lens of the second joined lens;

$PgFII1$ represents the partial dispersion ratio $(ng-nF)/(nF-nC)$ with respect to the g-line and the F-line of the positive lens of the second joined lens; and $PgFII2$ represents the partial dispersion ratio $(ng-nF)/(nF-nC)$ of the negative lens of the second joined lens with respect to the g-line and the F-line.

This embodiment allows the first joined lens to correct the first-order magnification chromatic aberration and the second joined lens to correct the second-order magnification chromatic aberration.

In the projection lens of the first embodiment, it is preferable that no lens is present on the optical axis between the first joined lens and the second joined lens. This embodiment allows the principal ray heights of both of the first and second joined lenses to be low so as to facilitate the correction of the magnification chromatic aberration.

Furthermore, in the projection lens of the first embodiment, it is preferable that a projection magnification for projecting an optical image illuminated by a light source onto a screen is a factor of 10 to 300. With a factor of 10 to 300, projection can be performed on a large-scale screen with a compact set with a small spatial optical modulator.

Furthermore, in the projection lens of the first embodiment, it is preferable that an aperture stop is provided on the side opposite to the screen of the projection lens. This embodiment achieves a compact projection lens with a short total length of the lens and well-corrected magnification chromatic aberrations.

Furthermore, a projection lens including a $1^{st}$ lens group with a negative power, a $2^{nd}$ lens group with a weak power, and a $3^{rd}$ lens group with a positive power are provided in this order from the screen side. An aperture stop is provided between the $2^{nd}$ lens group and the $3^{rd}$ lens group, and the projection lens according to the first embodiment is used as the $2^{nd}$ lens group. This embodiment can provide a projection lens with a wide angle and well-corrected magnification chromatic aberration.

In the above-described projection lens, it is preferable to satisfy the following requirements:

(6) $-0.35<f0/fI<-0.27$
(7) $0.01<f0/fII<0.06$
(8) $0.35<f0/fIII<0.38$ where fI, fII and fIII represent the focal lengths f0 the $1^{st}$, $2^{nd}$, and $3^{rd}$ lens groups, respectively, and of represents the focal length of the entire lens system.

This embodiment can provide a projection lens with a wide angle and well-corrected magnification chromatic aberration.

Furthermore, in the above-described projection lens, each of the $1^{st}$, $2^{nd}$ and $3^{rd}$ lens groups has at least one aspherical surface. This embodiment can correct distortion aberration, spherical aberration, and coma aberration satisfactorily, and provides a projection lens with a wide angle and well-corrected magnification chromatic aberration.

Furthermore, preferably, the projection lens constitutes an exit- side telecentric system. This embodiment provides a set without non-uniformity in colors, because the angle of incidence from the prism located between the projection lens and the spatial optical modulator is uniform regardless of the screen position.

Furthermore, preferably, the projection lens has an F number of not more than 3 and a half angle of view of not less than 40°. When the F number is not more than 3, a system can be bright to the maximum extent while suppressing the drop of the contrast, in the case where a liquid crystal panel or a reflection type mirror device is used as the spatial optical modulator. Furthermore, when the half angle of view is not less than 40°, the distance for projection onto a screen can be further shortened, so that, for example, a rear projection TV can be made compact.

Furthermore, a projection lens including a $1^{st}$ lens group with a weak power and a $2^{nd}$ lens group with a positive power in this order from the screen side is provided. An aperture stop is provided between the $1^{st}$ lens group and the $2^{nd}$ lens group, and the projection lens according to the first embodiment is used as the $1^{st}$ lens group. This embodiment achieves a compact projection lens with a short total length of the lens and well-corrected magnification chromatic aberrations, which can be used suitably for, for example, a projection lens for a front type projector.

Furthermore, a projection lens may constitute an optical system with an aperture stop back, and the projection lens of the first embodiment may be arranged on the screen side of the aperture stop. Herein, "an optical system with an aperture stop back" refers to a lens system where few lenses are arranged on the side opposite to the screen of the aperture stop. This lens system is constituted in such a manner that the interference between the illumination optical system and the lens on the side opposite to the screen of the aperture stop of the projection lens is eliminated, when used as a projector. This embodiment achieves a compact projection lens with a short total length of the lens and well-corrected magnification chromatic aberrations, which is used suitably, for example, as a projection lens for a front type projector that does not require a prism for color synthesis.

A projection lens according to a second embodiment of the present invention includes a $1^{st}$ lens group with a negative power, a $2^{nd}$ lens group with a weak power, and a $3^{rd}$ lens group with a positive power in this order from the screen side. An aperture stop is provided between the $2^{nd}$ lens group and the $3^{rd}$ lens group. The $2^{nd}$ lens group includes a first lens with a positive power, a second lens with a negative power, and a third lens with a positive power and an aspherical surface in this order from the screen side. The first lens of the $2^{nd}$ lens group and the second lens of the $2^{nd}$ lens group are joined. The following requirements are satisfied:

(9) $-0.35<f0/fI<-0.27$
(10) $0.01<f0/fII<0.06$
(11) $0.35<f0/fIII<0.38$ where f0 represents the focal length of the entire lens system;

fI represents the focal length of the $1^{st}$ lens group;
fII represents the focal length of the $2^{nd}$ lens group; and
fIII represents the focal length of the $3^{rd}$ lens group.

This embodiment can provide a projection lens with a reduced number of components, a wide angle and good telecentric properties.

A projection lens of a third embodiment of the present invention includes a $1^{st}$ lens group with a negative power, a $2^{nd}$ lens group with a weak power, and a $3^{rd}$ lens group with a positive power in this order from the screen side. An aperture stop is provided between the $2^{nd}$ lens group and the 3rd lens group. The $2^{nd}$ lens group includes a first lens with a negative power, a second lens with a positive power, and a third lens with a positive power and an aspherical surface in this order from the screen side. The first lens of the $2^{nd}$ lens group and the second lens of the $2^{nd}$ lens group are joined. The following requirements are satisfied:

(12) $-0.35<f0/fI<-0.27$
(13) $0.01<f0/fII<0.06$
(14) $0.35<f0/fIII<0.38$ where f0 represents the focal length of the entire lens system;

fI represents the focal length of the $1^{st}$ lens group;
fII represents the focal length of the $2^{nd}$ lens group; and
fIII represents the focal length of the $3^{rd}$ lens group.

This embodiment can provide a projection lens with a reduced number of components, a wide angle, good telecentric properties and well-corrected magnification chromatic aberration.

In the projection lens of the second and third embodiments, preferably, each of the $1^{st}$, $2^{nd}$ and $3^{rd}$ lens groups has at least one aspherical surface. This embodiment can correct distortion aberration, spherical aberration and coma aberrations satisfactorily, and provides a projection lens with a wide angle and well-corrected magnification chromatic aberration.

In the projection lens of the second and third embodiments, preferably, the F number is not more than 3, and the half angle of view is not less than 40°. When the F number is not more than 3, a system can be bright to the maximum extent while suppressing the drop of the contrast, in the case where a liquid crystal panel or a reflection type mirror device is used as the spatial optical modulator. Furthermore, when the half angle of view is not less than 400, the distance for projection onto a screen can be shortened further, so that a rear projection TV can be made compact.

An image enlargement projection system of the present invention includes a light source, a spatial optical modulator for forming an optical image while being illuminated by light radiated from the light source, and projecting means for projecting the optical image in the spatial light modulator. The projecting means can be the projection lens according to the present invention. According to this embodiment, a compact image enlargement projection system can be obtained.

A video projector of the present invention includes a light source, means for temporally restricting light from the light source to three colors of blue, green and red, a spatial optical modulator for forming optical images corresponding to the three color of blue, green and red that are changed temporally while being illuminated by light radiated from the light source, and projecting means for projecting the optical images in the spatial light modulator. The projecting means can be the projection lens according to the present invention. According to this video projector, since the magnification chromatic aberration is corrected significantly, the images of the three colors of blue, green and red can be projected onto the screen without displacement. Therefore, a bright and high definition image can be obtained. In addition, since the projection distance is short, the video projector can be used in a small space.

A rear projector of the present invention includes the above-described video projector, a mirror for bending light projected from the projection lens, and a transmission type screen for showing an image formed from the projected light. According to this rear projector, since the project lens with a short projection distance is used, a compact set can be achieved.

A multi-vision system of the present invention includes a plurality of systems and an image dividing circuit for dividing an image, each of the systems including the above-described video projector, a transmission type screen for showing an image formed from the projected light and a housing. According to this multi-vision system, since the project lens with a short projection distance is used, a set with a short depth can be achieved.

These and other advantages of the present invention will become apparent to those skilled in the art upon reading and understanding the following detailed description with reference to the accompanying drawings.

DESCRIPTION OF THE PREFERRED EMBODIMENTS

Embodiment 1

Figure 1:
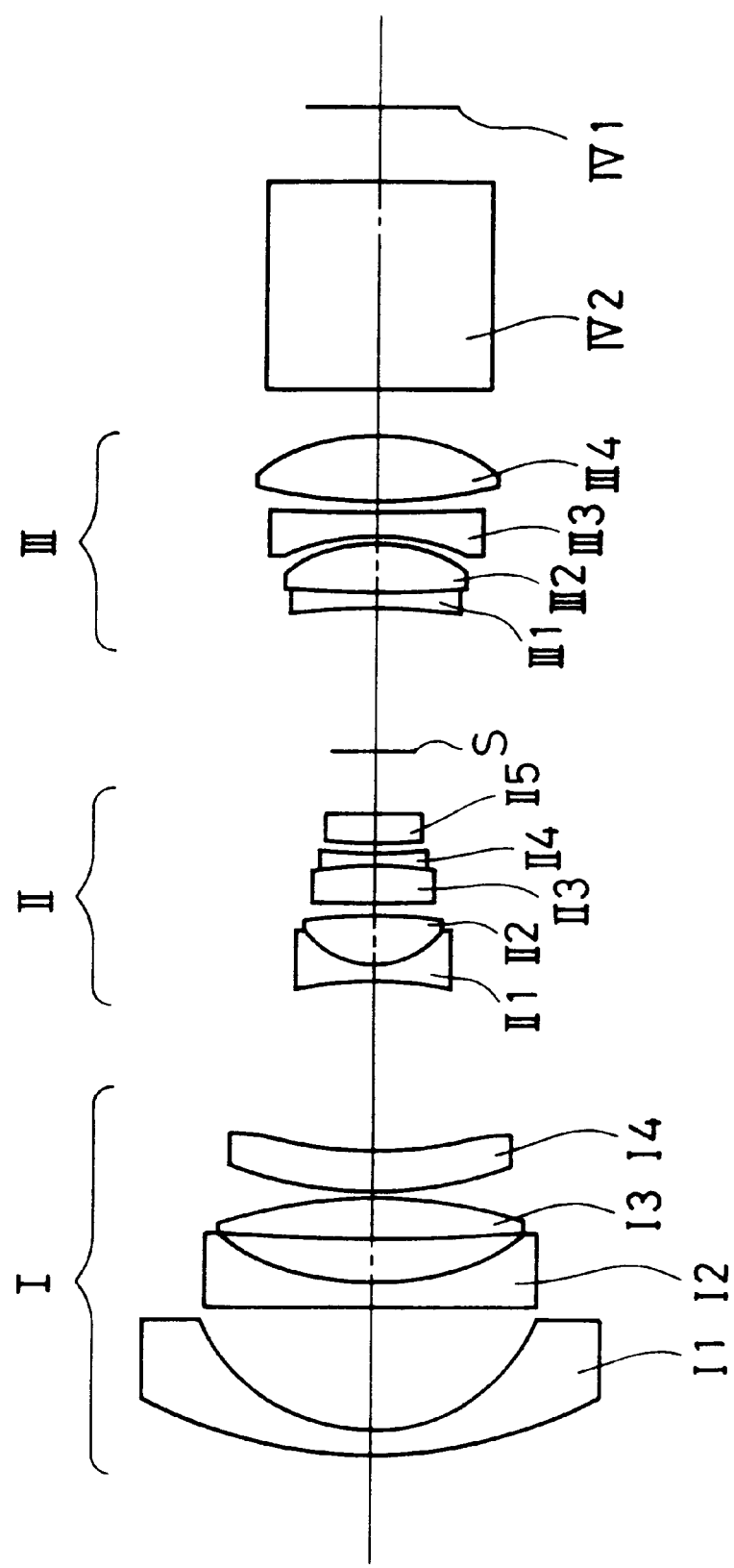
FIG. 1 is a configuration diagram of a projection lens according to Example 1 of Embodiment 1 of the present invention.

The present invention achieves a large angle of view and a long back focal length while satisfying distortion aberration, telecentric properties and magnification chromatic aberration with a suitable lens arrangement.

In order to obtain the telecentric properties, a principal ray is required to be curved from a half angle of view defined by the specification of a lens to the horizontal level. This means that the principal ray is curved to a larger extent than in a lens without the telecentric properties. This makes a large load for correction of the distortion aberration and the magnification chromatic aberration.

It is known that forming a symmetric structure with respect to an aperture stop is advantageous for correction of the distortion aberration and the magnification chromatic aberration. However, the principal ray cannot be symmetric, as long as telecentric properties are provided. Furthermore, in order to obtain a long back focal length, an inverted telephoto type structure is required. In this case, a concave lens in the front becomes the source of the distortion aberration or the magnification chromatic aberration.

In the present invention, the magnification chromatic aberration is corrected by the following arrangement: Lenses having a small difference in the refractive index and a difference in the Abbe number of about 10 to about 30 are combined and joined together to form a first joined lens. Lenses having a small difference in the refractive index, a small difference in the Abbe number and a large difference in the partial dispersion ratio are combined and joined together to form a second joined lens. The first joined lens and the second joined lens are arranged in the vicinity of an aperture stop and between the screen and the aperture stop, and the first joined lens is nearer the screen than the second joined lens is.

A first negative power lens group has a strong negative power to achieve a long back focal length and a high aperture efficiency, and constitutes a front group of a retrofocus type. Because of the strong negative power and the high principal ray height, even if the first negative power lens group is constituted by lenses having a large Abbe number, the F-line and the g-line are refracted more significantly than the d-line so that the magnification chromatic aberration is generated.

This magnification chromatic aberration is corrected by a positive lens in the negative power lens group. This positive lens can be formed of glass having a small Abbe number for the correction of the magnification chromatic aberration. The Abbe number is inversely proportional to the partial dispersion ratio, so that the glass having a small Abbe number has a large partial dispersion ratio. Therefore, the correction of the magnification chromatic aberration based on the F-line results in significant overcorrection for the g-line.

The final positive power lens group requires a large power to achieve telecentric properties. However, even if the final positive power lens group is constituted by lenses having a large Abbe number, because of the high principal ray height, the F-line and the g-line are refracted more significantly than the d-line so that the magnification chromatic aberration is generated.

This magnification chromatic aberration is corrected by a negative lens positioned on the screen side of the final positive power lens group. This negative lens can be formed of glass having a small Abbe number for the correction of the magnification chromatic aberration. The Abbe number is inversely proportional to the partial dispersion ratio, so that the glass having a small Abbe number has a large partial dispersion ratio. Therefore, the correction of the magnification chromatic aberration based on the F-line results in significant overcorrection for the g-line.

It is general and efficient to correct the magnification chromatic aberration with a lens in a relatively high position in the principal ray height. The axial chromatic aberration is corrected with a lens in a relatively high position in the axial ray height. Therefore, as for correction of chromatic aberration, the axial chromatic aberration is corrected with a lens in a relatively high position in the axial ray height and in a relatively low position in the principal ray height, and the magnification chromatic aberration is corrected with a lens in a relatively high position in the principal ray height.

However, in a lens with telecentric properties or a wide angle lens, the magnification chromatic aberration is generated to a large extent. In a projection lens for a projector that requires strict correction of the magnification chromatic aberration, even if the first-order magnification chromatic aberration has been corrected, the second-order magnification chromatic aberrations remains to a large extent, so that this causes problems for practical use. Furthermore, since the magnification chromatic aberration is corrected with a lens having a small Abbe number in a high position in the principal ray height, even if the magnification chromatic aberration is slightly undercorrected up to the midpoint of the angle of view, the magnification chromatic aberration becomes overcorrected rapidly to a larger extent as approaching the maximum angle of view.

For example, in the first negative power lens group, a glass having a small Abbe number is provided with a positive power and used to correct the magnification chromatic aberration. With a glass having a large Abbe number, the positive power is too large for the correction, so that the power of the negative lens in the first lens group becomes large to maintain the negative power of the first lens group. As a result, a large magnification chromatic aberration is generated, and other aberrations are generated significantly. Therefore, the glass having a small Abbe number is used for the correction of the magnification chromatic aberration. However, the glass having a small Abbe number has a large partial dispersion ratio. Therefore, although the magnification chromatic aberration can be corrected in the wavelength range from the F-line to the C-line, the aberration at the wavelength on the g-line is overcorrected. Because of the nature of glass, the smaller Abbe number corresponds to the larger partial dispersion ratio with linear relationship. Moreover, most glasses having an Abbe number of 30 or less that are suitable for the correction of the magnification chromatic aberration are significantly outside of the standard line obtained by connecting glasses C7 and F2, so that the partial dispersion ratio becomes large. Therefore, it is necessary to use a glass having a small Abbe number and a large partial dispersion ratio for the correction of the magnification chromatic aberration. Thus, the first-order magnification chromatic aberration has been corrected successfully, but it has been difficult to correct the second-order magnification chromatic aberration.

According to the present invention, a lens group having a low principal ray height arranged in the vicinity of the aperture stop that generally serves to correct the axial chromatic aberration is used to correct the first-order magnification chromatic aberration and the second-order magnification chromatic aberration. All the magnification chromatic aberrations cannot be corrected by this lens group, but this feature makes the following possible: The correction amounts of the lenses of the first lens group with a negative power and a third lens group with a positive power that are used to correct the magnification chromatic aberration can be reduced; the first-order magnification chromatic aberration can be corrected by a lens having a relatively small partial dispersion ratio; and the overcorrection of the second-order magnification chromatic aberration can be suppressed to a small level.

The lenses of the first joined lens on the screen side have different Abbe numbers so as to correct the first-order magnification chromatic aberration. In this case, when the difference in the refractive index among the lenses is small, the curvature on the joined surfaces can be large without affecting aberrations other than the chromatic aberration, so that the correction amount of the magnification chromatic aberration can be large. Furthermore, since the lenses are located in the vicinity of the aperture stop, the principal ray height is low so that the outer diameters of the lenses are relatively small. Therefore, even if the curvature on the joined surfaces is large, it is possible that the lens has a thickness at the end face, and that the center of the lens is not excessively thick.

The lenses of the second joined lens located the second farther from the screen side are provided with different partial dispersion ratios to correct the second-order magnification chromatic aberration. In this case, when the difference in the refractive index among the lenses is small and the difference in the Abbe number is small, the correction amount of the second-order magnification chromatic aberration can be large without affecting aberrations other than the second-order magnification chromatic aberration.

A projection lens according to Embodiment 1 of the present invention will be described with reference to the accompanying drawings.

FIG. 1 is a configuration diagram of a projection lens according to Embodiment 1.

Referring to FIG. 1, a screen (not shown) is arranged on the left side of the drawing.

The $1^{st}$ lens group I on the screen side has a strong negative power, so as to allow the axial ray to leap up significantly to ensure a back focus. Further, the $1^{st}$ lens group I advances the entrance pupil so that a large aperture efficiency can be achieved, and corrects the Petzval sum. The $1^{st}$ lens group I includes two negative lenses I1 and I2, a positive lens I3 for correction of chromatic aberrations and distortion aberration, and an aspherical lens I4 for correction of distortion aberration in this order from the screen side.

The $2^{nd}$ lens group II has a weak power and corrects the magnification chromatic aberration. The $2^{nd}$ lens group II includes the first lens II1 to the fifth lens II5 in this order from the screen side. The first lens II1 of the $2^{nd}$ lens group is a negative lens having a low refractive index and a large Abbe number. The second lens II2 of the $2^{nd}$ lens group is a positive lens formed of glass having a small difference in the refractive index, a large difference in the Abbe number, and a small difference in the partial dispersion ratio with respect to the first lens II1. The first lens II1 and the second lens II2 are joined together so as to constitute the first joined lens. It is preferable that the first lens II1 is formed of glass having an unusual partial dispersion, and that the first lens II1 and the second lens II2 have a small difference in the partial dispersion ratio. The third lens II3 of the $2^{nd}$ lens group is a positive lens having a small Abbe number and a high refractive index, and the fourth lens II4 of the $2^{nd}$ lens group is a negative lens formed of glass having a small difference in the Abbe number, a small difference in the refractive index and a large difference in the partial dispersion ratio with respect to the third lens II3. The third lens II3 and the fourth lens II4 are joined together so as to constitute the second joined lens. The fifth lens II5 of the $2^{nd}$ lens group is a negative lens with an aspherical surface.

The $3^{rd}$ lens group III has a positive power and achieves telecentric properties. In the $3^{rd}$ lens group III, the principal ray is in a high position, so that a large distortion aberration is generated. For this reason, an aspherical lens is added to correct the distortion aberration. The $3^{rd}$ lens group III includes a negative lens III1 having a high refractive index and a small Abbe number, a positive lens III2 having a low refractive index and a large Abbe number, a negative lens with an aspherical surface III3, and a positive lens III4 having a low refractive index and a large Abbe number in this order from the screen side. The negative lens III1 and the positive lens III2 are joined.

An aperture stop S is arranged between the $2^{nd}$ lens group II and the $3^{rd}$ lens group III.

Further, a spatial optical modulator IV1 is arranged on the side opposite to the screen of the $3^{rd}$ lens group III, and a prism IV2 is arranged between the spatial optical modulator IV1 and the lens groups.

In this manner, the prism IV2 intervenes between the spatial optical modulator IV1 and the projection lenses I to III, and therefore a long spatial gap is required between the spatial optical modulator IV1 and the lenses. In order words, a long back focal length is required. In addition, good telecentric properties are required to prevent non-uniformity in color or brightness due to the dependence on the angle of incidence from the prism IV2. According to the present embodiment, a long back focal length and telecentric properties are achieved with a wide angle of a half angle of view of 44°, and the distortion aberration and the magnification chromatic aberration are corrected successfully.

The projection lens of Embodiment 1 satisfies the following relationships (1) to (5):

(1) $-0.04 < ndI1-ndI2 < -0.003$
(2) $13.9 < vdI1-vdI2 < 31$
(3) $-0.039 < ndII1-ndII2 < 0.001$
(4) $0.8 < vdII1-vdII2 < 11.5$
(5) $-0.033 < PgFII1-PgFII2 < 0.009$ where ndI1 represents the refractive index of the negative lens II1 of the first joined lens of the $2^{nd}$ lens group II, ndI2 represents the refractive index of the positive lens II2 of the first joined lens, vdI1 represents the Abbe number of the negative lens Il1 of the first joined lens, vdI2 represents the Abbe number of the positive lens II2 of the first joined lens, ndII1 represents the refractive index of the positive lens II3 of the second joined lens, ndII2 represents the refractive index of the negative lens II4 of the second joined lens, vdII1 represents the Abbe number of the positive lens II3 of the second joined lens, vdII2 represents the Abbe number of the negative lens II4 of the second joined lens, PgFII1 represents the partial dispersion ratio (ng-nF)/(nF-nC) with respect to the g-line and the F-line of the positive lens II3 of the second joined lens, and PgFII2 represents the partial dispersion ratio (ng-nF)/(nF-nC) with respect to the g-line and the F-line of the negative lens II4 of the second joined lens.

Inequality (1) relates to the difference in the refractive index between the negative lens and the positive lens of the first joined lens. When the difference is below the lower limit, the correction is not successful due to the undercorrection of astigmatism. When the difference is above the upper limit, the correction is not successful due to the overcorrection of astigmatism.

Inequality (2) relates to the difference in the Abbe number between the negative lens and the positive lens of the first joined lens. When the difference is below the lower limit, the correction is not successful due to the undercorrection of the first-order magnification chromatic aberration. When the difference is above the upper limit, there is no combination of existent lenses.

Inequality (3) relates to the difference in the refractive index between the positive lens and the negative lens of the second joined lens. When the difference is below the lower limit, the correction is not successful due to the overcorrection of astigmatism. When the difference is above the upper limit, there is no combination of existent lenses that satisfies the relationships (4) and (5) at the same time.

Inequality (4) relates to the difference in the Abbe number between the positive lens and the negative lens of the second joined lens. When the difference is below the lower limit, there is no combination of existent lenses that satisfies the relationships (3) and (5) at the same time. When the difference is above the upper limit, the correction is not successful due to the undercorrection of the first-order magnification chromatic aberration.

Inequality (5) relates to the difference in the partial dispersion ratio with respect to the g-line and the F-line between the positive lens and the negative lens of the second joined lens. When the difference is below the lower limit, there is no combination of existent lenses that satisfies the relationships (3) and (4) at the same time. When the difference is above the upper limit, the correction is not successful due to the undercorrection of the second-order magnification chromatic aberration.

The projection lens of the present embodiment preferably satisfies the following relationships (6) to (8):

(6) $-0.35 < f0/fI < -0.27$
(7) $0.01 < f0/fII < 0.06$
(8) $0.35 < f0/fIII < 0.38$ where f0 represents the focal length of the entire lens system, fI represents the focal length of the $1^{st}$ lens group, fII represents the focal length of the 2nd lens group, and fIII represents the focal length of the $3^{rd}$ lens group.

Inequality (6) relates to the ratio of the focal length of the entire lens system to the focal length of the $1^{st}$ lens group, which relates to the power of the $1^{st}$ lens group. When the ratio is below the lower limit, the correction is not successful due to the overcorrection of astigmatism. When the ratio is above the upper limit, a back focus cannot be obtained.

Inequality (7) relates to the ratio of the focal length of the entire lens system to the focal length of the $2^{nd}$ lens group, which relates to the power of the $2^{nd}$ lens group. When the ratio is below the lower limit, the correction is not successful due to the overcorrection of astigmatism. When the ratio is above the upper limit, a back focus cannot be obtained.

Inequality (8) relates to the ratio of the focal length of the entire lens system to the focal length of the $3^{rd}$ lens group, which relates to the power of the $3^{rd}$ lens group. When the ratio is below the lower limit, the telecentric properties cannot be obtained. When the ratio is above the upper limit, coma aberration or astigmatism cannot be corrected.

Hereinafter, the present embodiment will be described by way of Example 1 with specific values.

Example 1

FIG. 1 is a configuration diagram of the projection lens according to Example 1 of Embodiment 1.

Example 1 is a projection lens having $F_{NO}=3.0$, a focal length f=10.52, and a half angle of view ω=44°. This example is designed for the purpose of having a long back focal length and telecentric properties, and correcting the magnification chromatic aberration and the distortion aberration by satisfying the relationships (1) to (5).

Table 1 shows specific values. "ri" in Table 1 represents the radius of curvature of the surface of each lens, and the subscript "i" shows the number assigned to the surface of each lens sequentially from the screen. "di" represents the thickness of a lens or the gap between lenses, and the subscript "i" shows the number assigned to each lens or each gap between lenses sequentially from the screen. "ni" represents the refractive index on the d-line of each lens, and the subscript "i" shows the number assigned to each lens sequentially from the screen. "vi" represents the Abbe number on the d-line of each lens, and the subscript "i" shows the number assigned to each lens sequentially from the screen. "PgFi" represents the partial dispersion ratio (ng-nF)/(nF-nC) with respect to the g-line and the F-line, and the subscript "i" shows the number assigned to each lens sequentially from the screen.

The aspherical surface is a rotationally symmetric aspherical surface represented by:

$$X = \frac{\frac{h^2}{r}}{1 + \{1 - (h/r)^2\}^{\frac{1}{2}}} + \sum_{i=3}^{10} a_i \cdot h^i$$

where X is a displacement magnitude from the apex of the lens in a position of a radius distance h from the optical axis in the aperture of the lens.

Figures 2A, 2B, 2C, 2D, 2E:
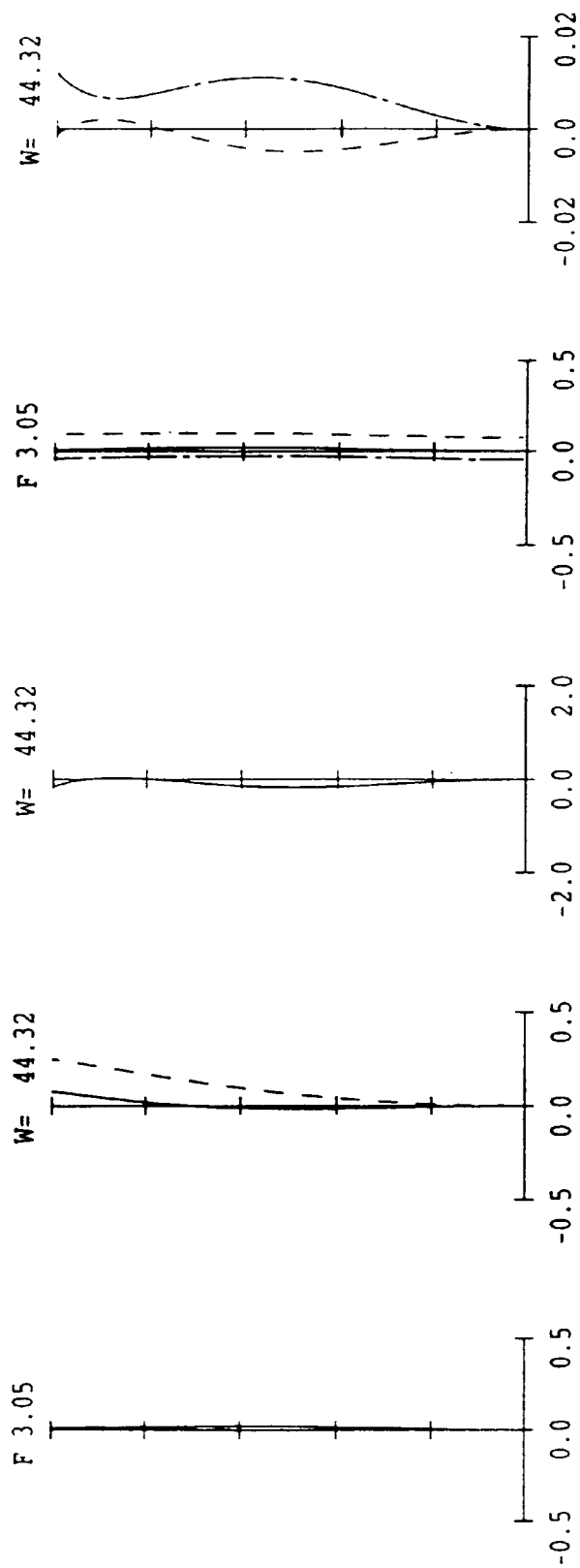
FIGS. 2a–2e is an aberration graph of the projection lens of Example 1.

FIGS. 2 (a), (b), (c), (d) and (e) show the spherical aberration (mm), astigmatism (mm), distortion aberration (%), axial chromatic aberration (mm) and magnification chromatic aberration (mm) of Example 1, respectively. In the spherical aberration graph of FIG. 2(a), the solid line represents the e-line, and the broken line represents sine conditions. In the astigmatism graph of FIG. 2(b), the solid line represents the sagittal field curvature, and the broken line represents the meridional field curvature. In the axial chromatic aberration graph of FIG. 2(d), the solid line represents values with respect to the e-line, the broken line represents values with respect to the F-line, and the dashed line represents values with respect to the C-line. In the magnification chromatic aberration graph of FIG. 2(e), the broken line represents values with respect to the F-line, and the dashed line represents values with respect to the C-line.

TABLE 1

$f0 = 10.52$, diameter ratio 1:3.0, $\omega = 44°$
$ndI1 - ndI2 = -0.00348$
$vdI1 - vdI2 = 15.6$
$ndII1 - ndII2 = -0.00261$
$vdII1 - vdII2 = 9.9$
$PgFII1 - PgFII2 = -0.02869$
$f0/fI = -0.28$
$f0/fII = 0.02$
$f0/fIII = 0.36$

| radius of curvature (mm) | distance between surfaces in axis direction (mm) | Nd | vd | PgF |
|---|---|---|---|---|
| r1 = 55.786 | d1 = 3.0 | n1 = 1.61800 | v1 = 63.39 | PgF1 = 0.5405 |
| r2 = 21.613 | d2 = 13.8 | | | |
| r3 = 2869.452 | d3 = 3.0 | n2 = 1.61800 | v2 = 63.39 | PgF2 = 0.5405 |
| r4 = 29.150 | d4 = 5.0 | | | |
| r5 = 222.869 | d5 = 5.0 | n3 = 1.76180 | v3 = 26.91 | PgF3 = 0.6064 |
| r6 = −57.787 | d6 = 0.7 | | | |
| r7 = 51.256 | d7 = 4.5 | n4 = 1.49153 | v4 = 57.15 | PgF4 = 0.5430 |
| r8 = 31.655 | d8 = 19.7 | | | |
| r9 = −39.029 | d9 = 2.0 | n5 = 1.49700 | v5 = 81.61 | PgF5 = 0.5387 |
| r10 = 10.000 | d10 = 5.5 | n6 = 1.50048 | v6 = 66.00 | PgF6 = 0.5311 |
| r11 = −81.056 | d11 = 1.3 | | | |
| r12 = 163.305 | d12 = 4.5 | n7 = 1.74950 | v7 = 35.00 | PgF7 = 0.5905 |
| r13 = −41.718 | d13 = 1.5 | n8 = 1.75211 | v8 = 25.10 | PgF8 = 0.6192 |
| r14 = 110.612 | d14 = 1.0 | | | |
| r15 = 60.988 | d15 = 3.5 | n9 = 1.49153 | v9 = 57.15 | PgF9 = 0.5430 |
| r16 = −303.370 | d16 = 7.2 | | | |
| r17 = 0.000 | d17 = 16.7 | | | |
| r18 = −78.575 | d18 = 2.0 | n10 = 1.76180 | v10 = 26.91 | PgF10 = 0.6064 |
| r19 = 132.073 | d19 = 1.1 | n11 = 1.49700 | v11 = 81.61 | PgF11 = 0.5387 |
| r20 = −17.522 | d20 = 0.7 | | | |
| r21 = −32.293 | d21 = 3.0 | n12 = 1.49153 | v12 = 57.15 | PgF12 = 0.5430 |
| r22 = −1741.411 | d22 = 1.1 | | | |
| r23 = 59.402 | d23 = 8.0 | n13 = 1.49700 | v13 = 81.61 | PgF13 = 0.5387 |
| r24 = −21.080 | d24 = 5.0 | | | |
| r25 = 0.0 | d25 = 24.0 | n14 = 1.51680 | v14 = 64.20 | PgF14 = 0.5342 |
| r26 = 0.0 | d26 = 13.77 | | | |

The coefficients of the aspherical surfaces of the aspherical lenses are shown below.

The coefficient of the aspherical surface of the 8th surface:

$a4 = -2.90129e-5$
$a6 = -4.19731e-8$
$a8 = -1.92689e-11$
$a10 = 1.46061e-13$

The coefficient of the aspherical surface of the 16th surface:

$a4 = 3.53567e-5$
$a6 = -4.97498e-7$
$a8 = 2.18089e-8$
$a10 = -3.08225e-10$

The coefficient of the aspherical surface of the 21st surface:

$a4 = -4.01768e-5$
$a6 = -7.32717e-8$
$a8 = 1.49014e-10$
$a10 = -3.26768e-12$

TABLE 1-continued

The coefficient of the aspherical surface of the 22nd surface:

a4 = 2.75909e-6
a6 = 3.49495e-8
a8 = 0.0
a10 = 0.0

Example 2

Hereinafter, Embodiment 1 will be described by Example 2 as another example with specific values.

Figure 3:
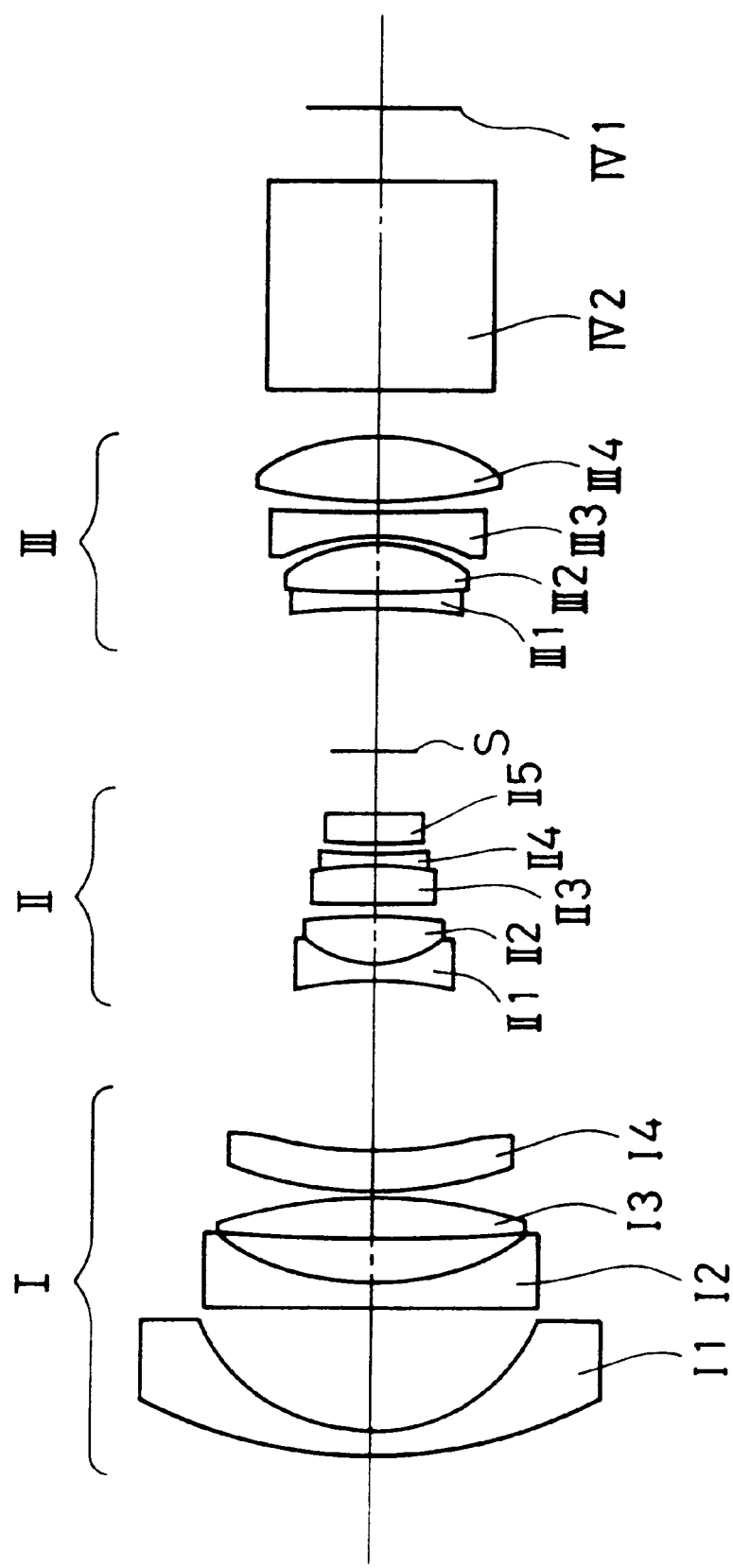
FIG. 3 is a configuration diagram of a projection lens according to Example 2 of Embodiment 1 of the present invention.

FIG. 3 is a configuration diagram of the projection lens according to Example 2 of Embodiment 1. The components that have the same functions as those in FIG. 1 bear the same symbols.

Example 2 is a projection lens having $F_{NO}=3.0$, a focal length f=10.40, and a half angle of view ω=44°. This example is designed for the purpose of having a long back focal length and telecentric properties, and correcting the magnification chromatic aberration and the distortion aberration by satisfying the relationships (1) to (5).

Table 2 shows specific values. The symbols in Table 2 represent the same as those in Table 1 of Example 1.

Figure 4:
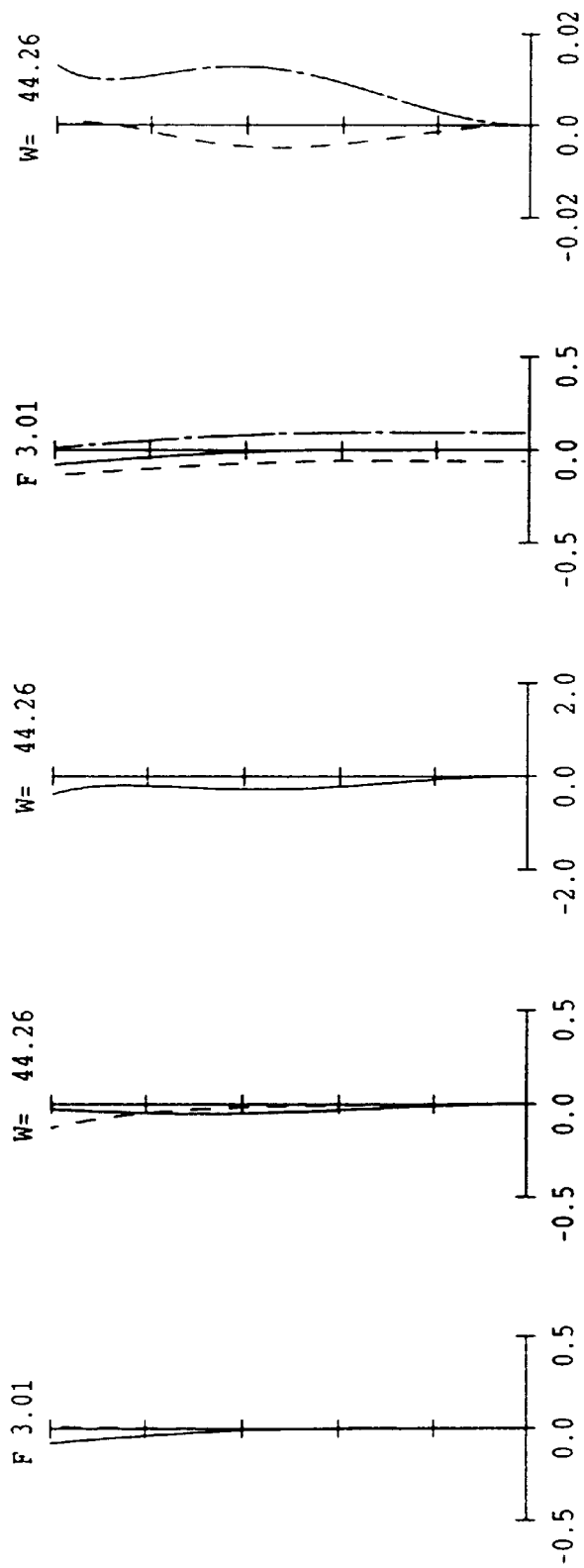
FIGS. 4a–4e is an aberration graph of the projection lens of Example 2.

FIGS. 4 (a), (b), (c), (d) and (e) show the spherical aberration (mm), astigmatism (mm), distortion aberration (%), axial chromatic aberration (mm) and magnification chromatic aberration (mm) of Example 2, respectively. The graphs in FIG. 4 are plotted in the same manner as in FIG. 2.

TABLE 2 f0 = 10.40, diameter ratio 1:3.0, ω = 44°
ndI1—ndI2 = −0.01418
vdI1–vdI2 = 30.59
ndII1–ndII2 = −0.00662
vdII1–vdII2 = 0.92
PgFII1–PgFII2 = −0.00931
f0/fI = −0.28
f0/fII = 0.02
f0/fIII = 0.36

| radius of curvature (mm) | distance between surfaces in axis direction (mm) | Nd | vd | PgF |
|---|---|---|---|---|
| r1 = 55.786 | d1 = 3.0 | n1 = 1.61800 | v1 = 63.39 | PgF1 = 0.5405 |
| r2 = 21.613 | d2 = 13.8 | | | |
| r3 = 2869.452 | d3 = 3.0 | n2 = 1.61800 | v2 = 63.39 | PgF2 = 0.5405 |
| r4 = 29.150 | d4 = 5.0 | | | |
| r5 = 222.869 | d5 = 5.0 | n3 = 1.75670 | v3 = 36.34 | PgF3 = 0.5843 |
| r6 = −57.787 | d6 = 0.7 | | | |
| r7 = 51.256 | d7 = 4.5 | n4 = 1.49153 | v4 = 57.15 | PgF4 = 0.5430 |
| r8 = 31.655 | d8 = 19.7 | | | |
| r9 = −39.029 | d9 = 2.0 | n5 = 1.49700 | v5 = 81.61 | PgF5 = 0.5387 |
| r10 = 12.000 | d10 = 5.5 | n6 = 1.51118 | v6 = 51.01 | PgF6 = 0.5632 |
| r11 = −92.980 | d11 = 1.3 | | | |
| r12 = 163.305 | d12 = 4.5 | n7 = 1.75520 | v7 = 27.53 | PgF7 = 0.6030 |
| r13 = −55.000 | d13 = 1.5 | n8 = 1.76182 | v8 = 26.61 | PgF8 = 0.6123 |
| r14 = 111.486 | d14 = 1.0 | | | |
| r15 = 60.988 | d15 = 3.5 | n9 = 1.49153 | v9 = 57.15 | PgF9 = 0.5430 |
| r16 = −303.370 | d16 = 7.2 | | | |
| r17 = 0.000 | d17 = 16.7 | | | |
| r18 = −78.575 | d18 = 2.0 | n10 = 1.76180 | v10 = 26.91 | PgF10 = 0.6064 |
| r19 = 113.198 | d19 = 1.1 | n11 = 1.49700 | v11 = 81.61 | PgF11 = 0.5387 |
| r20 = −17.522 | d20 = 0.7 | | | |
| r21 = −32.293 | d21 = 3.0 | n12 = 1.49153 | v12 = 57.15 | PgF12 = 0.5430 |
| r22 = −1741.411 | d22 = 1.1 | | | |
| r23 = 59.402 | d23 = 8.0 | n13 = 1.49700 | v13 = 81.61 | PgF13 = 0.5387 |
| r24 = −21.080 | d24 = 5.0 | | | |
| r25 = 0.0 | d25 = 24.0 | n14 = 1.51680 | v14 = 64.20 | PgF14 = 0.5342 |
| r26 = 0.0 | d26 = 13.10 | | | |

The coefficients of the aspherical surfaces of the aspherical lenses are shown below.

The coefficient of the aspherical surface of the 8th surface:

a4 = −2.90129e-5
a6 = −4.19731e-8
a8 = −1.92689e-11
a10 = 1.46061e-13

TABLE 2-continued

The coefficient of the aspherical surface of the 16th surface:

a4 = 3.53567e-5
a6 = -4.97498e-7
a8 = 2.18089e-8
a10 = -3.08225e-10

The coefficient of the aspherical surface of the 21st surface:

a4 = -4.01768e-5
a6 = -7.32717e-8
a8 = 1.49014e-10
a10 = -3.26768e-12

The coefficient of the aspherical surface of the 22nd surface:

a4 = 2.75909e-6
a6 = 3.49495e-8
a8 = 0.0
a10 = 0.0

Example 3

Hereinafter, Embodiment 1 will be described by Example 3 as another example with specific values.

Figure 5:
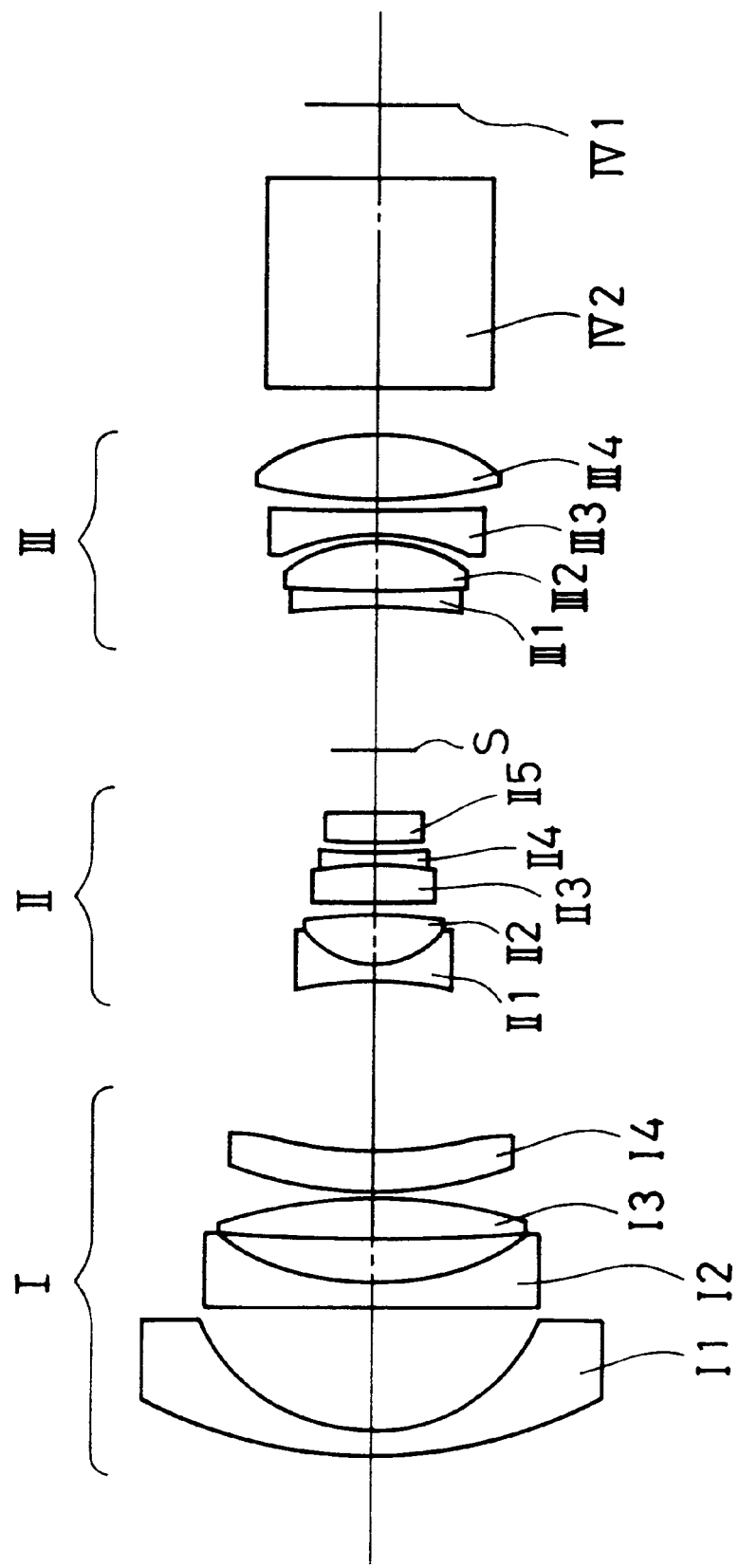
FIG. 5 is a configuration diagram of a projection lens according to Example 3 of Embodiment 1 of the present invention.
Figure 6E:
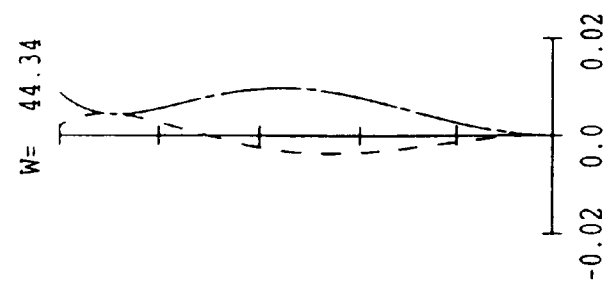
FIGS. 6a–6e is an aberration graph of the projection lens of Example 3.
Figure 6D:
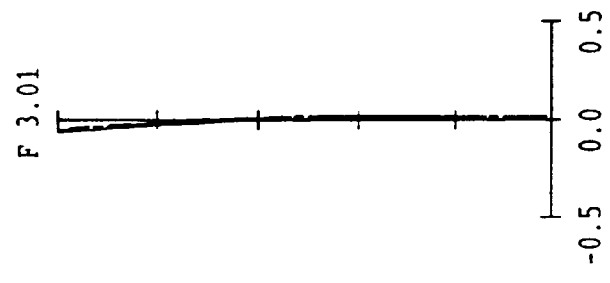
Figure 6C:
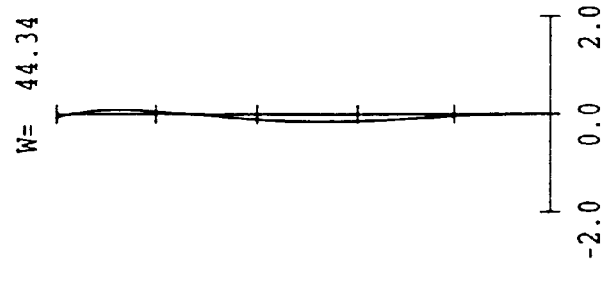
Figure 6B:
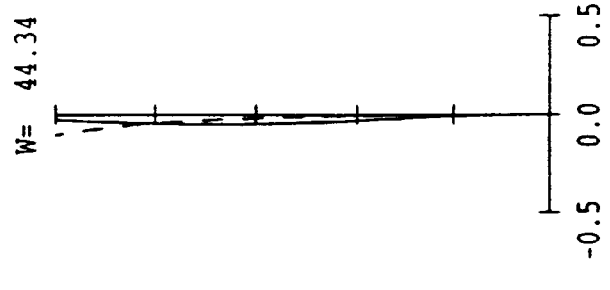
Figure 6A:
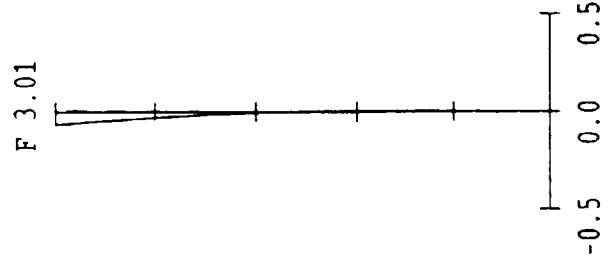

FIG. 5 is a configuration diagram of the projection lens according to Example 3 of Embodiment 1. The components that have the same functions as those in FIG. 1 bear the same symbols.

Example 3 is a projection lens having $F_{NO}$=3.0, a focal length f=10.42, and a half angle of view ω=44°. This example is designed for the purpose of having a long back focal length and telecentric properties, and correcting the magnification chromatic aberration and the distortion aberration by satisfying the relationships (1) to (5).

Table 3 shows specific values. The symbols in Table 3 represent the same as those in Table 1 of Example 1.

FIGS. 6 (a), (b), (c), (d) and (e) show the spherical aberration (mm), astigmatism (mm), distortion aberration (%), axial chromatic aberration (mm) and magnification chromatic aberration (mm) of Example 3, respectively. The graphs in FIG. 6 are plotted in the same manner as in FIG. 2.

TABLE 3 f0 = 10.42, diameter ratio 1:3.0, ω = 44°
ndI1—ndI2 = -0.008
vdI1–vdI2 = 25.00
ndII1–ndII2 = -0.01232
vdII1–vdII2 = 8.39
PgFII1–PgFII2 = -0.02183
f0/fI = -0.28
f0/fII = 0.02
f0/fIII = 0.36

| radius of curvature (mm) | distance between surfaces in axis direction (mm) | Nd | vd | PgF |
|---|---|---|---|---|
| r1 = 55.786 | d1 = 3.0 | n1 = 1.61800 | v1 = 63.39 | PgF1 = 0.5405 |
| r2 = 21.613 | d2 = 13.8 | | | |
| r3 = 2869.452 | d3 = 3.0 | n2 = 1.61800 | v2 = 63.39 | PgF2 = 0.5405 |
| r4 = 29.150 | d4 = 5.0 | | | |
| r5 = 222.869 | d5 = 5.0 | n3 = 1.76180 | v3 = 26.91 | PgF3 = 0.6064 |
| r6 = -57.787 | d6 = 0.7 | | | |
| r7 = 51.256 | d7 = 4.5 | n4 = 1.49153 | v4 = 57.15 | PgF4 = 0.5430 |
| r8 = 31.655 | d8 = 19.7 | | | |
| r9 = -39.029 | d9 = 2.0 | n5 = 1.45650 | v5 = 90.77 | PgF5 = 0.5352 |
| r10 = 10.687 | d10 = 5.5 | n6 = 1.46450 | v6 = 65.77 | PgF6 = 0.5353 |
| r11 = -94.941 | d11 = 1.3 | | | |
| r12 = 163.305 | d12 = 4.5 | n7 = 1.74950 | v7 = 35.00 | PgF7 = 0.5906 |
| r13 = -41.556 | d13 = 1.5 | n8 = 1.76182 | v8 = 26.61 | PgF8 = 0.6123 |
| r14 = 115.658 | d14 = 1.0 | | | |
| r15 = 60.988 | d15 = 3.5 | n9 = 1.49153 | v9 = 57.15 | PgF9 = 0.5430 |
| r16 = -303.370 | d16 = 7.2 | | | |
| r17 = 0.000 | d17 = 16.7 | | | |
| r18 = -78.575 | d18 = 2.0 | n10 = 1.76180 | v10 = 26.91 | PgF10 = 0.6064 |
| r19 = 113.135 | d19 = 1.1 | n11 = 1.49700 | v11 = 81.61 | PgF11 = 0.5387 |
| r20 = -17.522 | d20 = 0.7 | | | |
| r21 = -32.293 | d21 = 3.0 | n12 = 1.49153 | v12 = 57.15 | PgF12 = 0.5430 |
| r22 = -1741.411 | d22 = 1.1 | | | |
| r23 = 59.402 | d23 = 8.0 | n13 = 1.49700 | v13 = 81.61 | PgF13 = 0.5387 |
| r24 = -21.080 | d24 = 5.0 | | | |

TABLE 3-continued

| | | | | |
|---|---|---|---|---|
| r25 = 0.0 | d25 = 24.0 | n14 = −1.51680 | v14 = 64.20 | PgF14 = 0.5342 |
| r26 = 0.0 | d26 = 13.10 | | | |

The coefficients of the aspherical surfaces of the aspherical lenses are shown below.

The coefficient of the aspherical surface of the 8th surface:

a4 = −2.90129e-5
a6 = −4.19731e-8
a8 = −1.92689e-11
a10 = 1.46061e-13

The coefficient of the aspherical surface of the 16th surface:

a4 = 3.53567e-5
a6 = −4.97498e-7
a8 = 2.18089e-8
a10 = −3.08225e-10

The coefficient of the aspherical surface of the 21st surface:

a4 = −4.01768e-5
a6 = −7.32717e-8
a8 = 1.49014e-10
a10 = −3.26768e-12

The coefficient of the aspherical surface of the 22nd surface:

a4 = 2.75909e-6
a6 = 3.49495e-8
a8 = 0.0
a10 = 0.0

Example 4

Hereinafter, Embodiment 1 will be described by Example 4 as another example with specific values.

Figure 7:
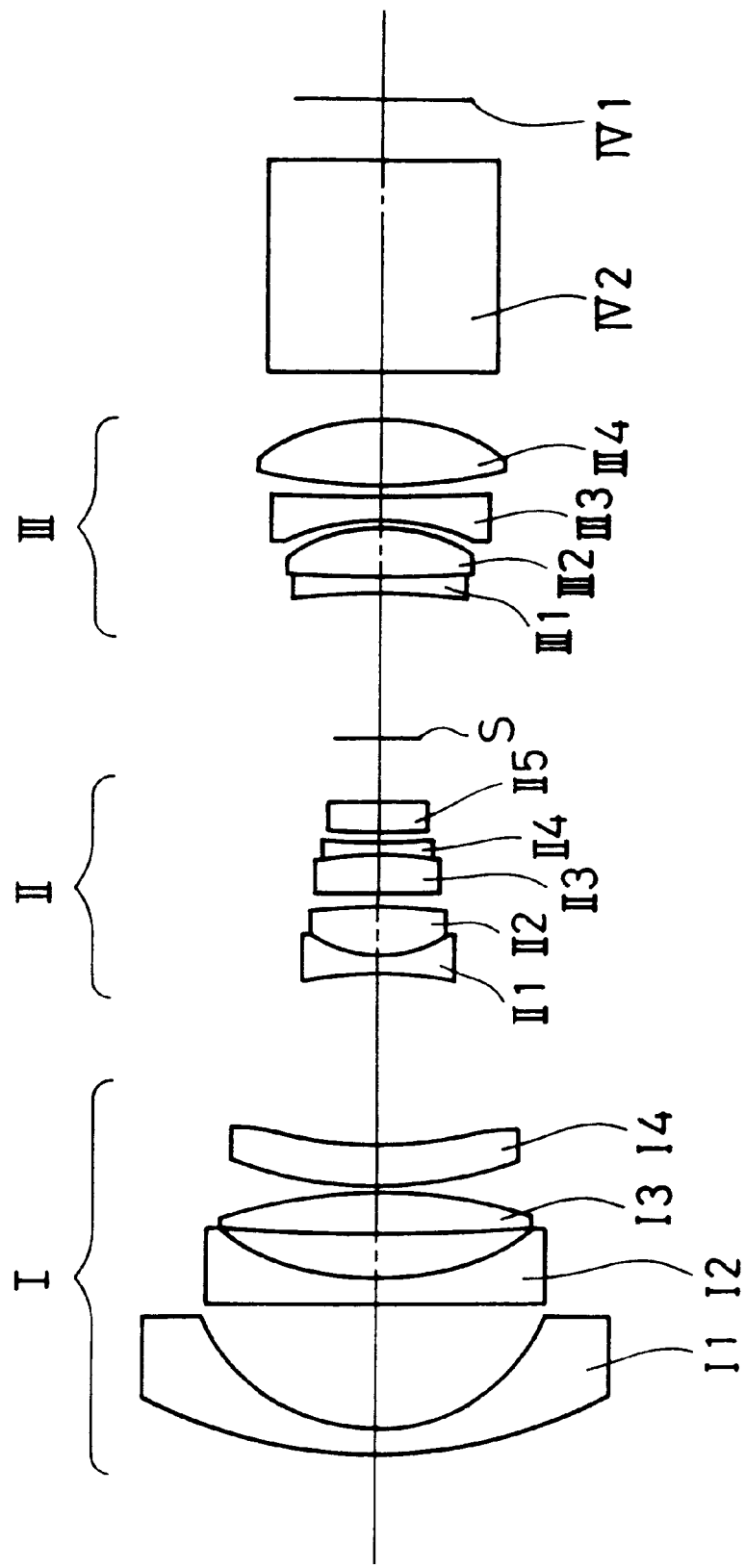
FIG. 7 is a configuration diagram of a projection lens according to Example 4 of Embodiment 1 of the present invention.

FIG. 7 is a configuration diagram of the projection lens according to Example 4 of Embodiment 1. The components that have the same functions as those in FIG. 1 bear the same symbols.

Example 4 is a projection lens having $F_{NO}$=3.0, a focal length f=10.42, and a half angle of view ω=44°. This example is designed for the purpose of having a long back focal length and telecentric properties, and correcting the magnification chromatic aberration and the distortion aberration by satisfying the relationships (1) to (5).

Table 4 shows specific values. The symbols in Table 4 represent the same as those in Table 1 of Example 1.

Figure 8:
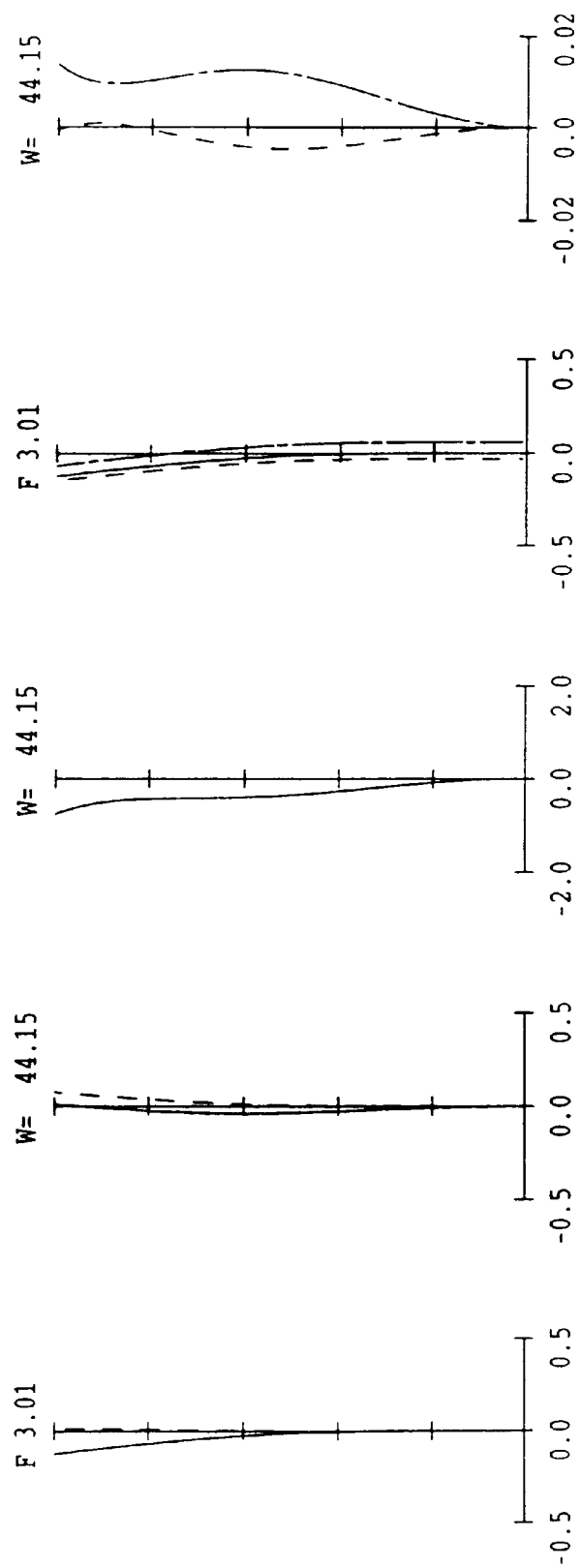
FIGS. 8a–8e is an aberration graph of the projection lens of Example 4.

FIG. 8 (a), (b), (c), (d) and (e) show the spherical aberration (mm), astigmatism (mm), distortion aberration (%), axial chromatic aberration (mm) and magnification chromatic aberration (mm) of Example 4, respectively. The graphs in FIG. 8 are plotted in the same manner as in FIG. 2.

TABLE 4 f0 = 10.42, diameter ratio 1:3.0, ω = 44°
ndI1—ndI2 = −0.03822
vdI1–vdI2 = 21.90
ndII1–ndII2 = −0.00077
vdII1–vdII2 = 3.94
PgFII1–PgFII2 = −0.01737
f0/fI = −0.28
f0/fII = 0.02
f0/fIII = 0.36

| radius of curvature (mm) | distance between surfaces in axis direction (mm) | Nd | vd | PgF |
|---|---|---|---|---|
| r1 = 55.786 | d1 = 3.0 | n1 = 1.61800 | v1 = 63.39 | PgF1 = 0.5405 |
| r2 = 21.613 | d2 = 13.8 | | | |
| r3 = 2869.452 | d3 = 3.0 | n2 = 1.61800 | v2 = 63.39 | PgF2 = 0.5405 |
| r4 = 29.150 | d4 = 5.0 | | | |
| r5 = 222.869 | d5 = 5.0 | n3 = 1.75690 | v3 = 31.70 | PgF3 = 0.5987 |
| r6 = −57.787 | d6 = 0.7 | | | |
| r7 = 51.256 | d7 = 4.5 | n4 = 1.49153 | v4 = 57.15 | PgF4 = 0.5430 |
| r8 = 31.655 | d8 = 19.7 | | | |
| r9 = −39.029 | d9 = 2.0 | n5 = 1.56907 | v5 = 71.30 | PgF5 = 0.5450 |
| r10 = 14.366 | d10 = 5.5 | n6 = 1.60729 | v6 = 49.40 | PgF6 = 0.5605 |
| r11 = −104.780 | d11 = 1.3 | | | |
| r12 = 163.305 | d12 = 4.5 | n7 = 1.74000 | v7 = 31.70 | PgF7 = 0.5906 |

TABLE 4-continued

| | | | | |
|---|---|---|---|---|
| r13 = −40.921 | d13 = 1.5 | n8 = 1.74077 | v8 = 27.76 | PgF8 = 0.6079 |
| r14 = 108.451 | d14 = 1.0 | | | |
| r15 = 60.988 | d15 = 3.5 | n9 = 1.49153 | v9 = 57.15 | PgF9 = 0.5430 |
| r16 = −303.370 | d16 = 7.2 | | | |
| r17 = 0.000 | d17 = 16.7 | | | |
| r18 = −78.575 | d18 = 2.0 | n10 = 1.76180 | v10 = 26.91 | PgF10 = 0.6064 |
| r19 = 113.125 | d19 = 1.1 | n11 = 1.49700 | v11 = 81.61 | PgF11 = 0.5387 |
| r20 = −17.522 | d20 = 0.7 | | | |
| r21 = −32.293 | d21 = 3.0 | n12 = 1.49153 | v12 = 57.15 | PgF12 = 0.5430 |
| r22 = −1741.411 | d22 = 1.1 | | | |
| r23 = 59.402 | d23 = 8.0 | n13 = 1.49700 | v13 = 81.61 | PgF13 = 0.5387 |
| r24 = −21.080 | d24 = 5.0 | | | |
| r25 = 0.0 | d25 = 24.0 | n14 = 1.51680 | v14 = 64.20 | PgF14 = 0.5342 |
| r26 = 0.0 | d26 = 13.10 | | | |

The coefficients of the aspherical surfaces of the aspherical lenses are shown below.

The coefficient of the aspherical surface of the 8th surface:

$a4 = -2.90129e-5$
$a6 = -4.19731e-8$
$a8 = -1.92689e-11$
$a10 = 1.46061e-13$

The coefficient of the aspherical surface of the 16th surface:

$a4 = 3.53567e-5$
$a6 = -4.97498e-7$
$a8 = 2.18089e-8$
$a10 = -3.08225e-10$

The coefficient of the aspherical surface of the 21st surface:

$a4 = -4.01768e-5$
$a6 = -7.32717e-8$
$a8 = 1.49014e-10$
$a10 = -3.26768e-12$

The coefficient of the aspherical surface of the 22nd surface:

$a4 = 2.75909e-6$
$a6 = 3.49495e-8$
$a8 = 0.0$
$a10 = 0.0$

Example 5

Hereinafter, the present embodiment 1 will be described by Example 5 as another example with specific values.

Figure 9:
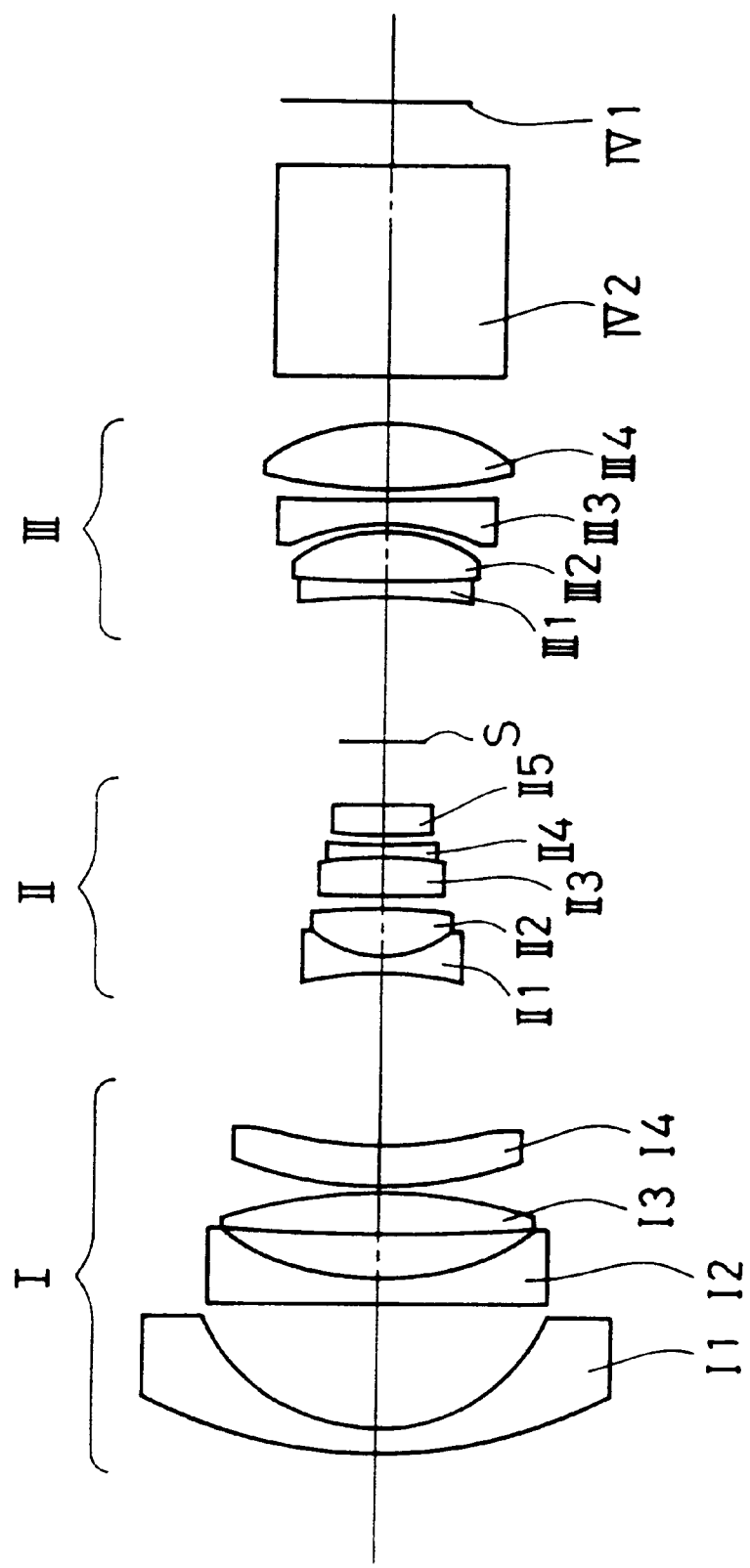
FIG. 9 is a configuration diagram of a projection lens according to Example 5 of Embodiment 1 of the present invention.

FIG. 9 is a configuration diagram of the projection lens according to Example 5 of Embodiment 1. The components that have the same functions as those in FIG. 1 bear the same symbols.

Example 5 is a projection lens having $F_{NO}=3.0$, a focal length f=10.32, and a half angle of view ω=44°. This example is designed for the purpose of having a long back focal length and telecentric properties, and correcting the magnification chromatic aberration and the distortion aberration by satisfying the relationships (1) to (5).

Table 5 shows specific values. The symbols in Table 5 represent the same as those in Table 1 of Example 1.

Figures 10A, 10B, 10C, 10D, 10E:
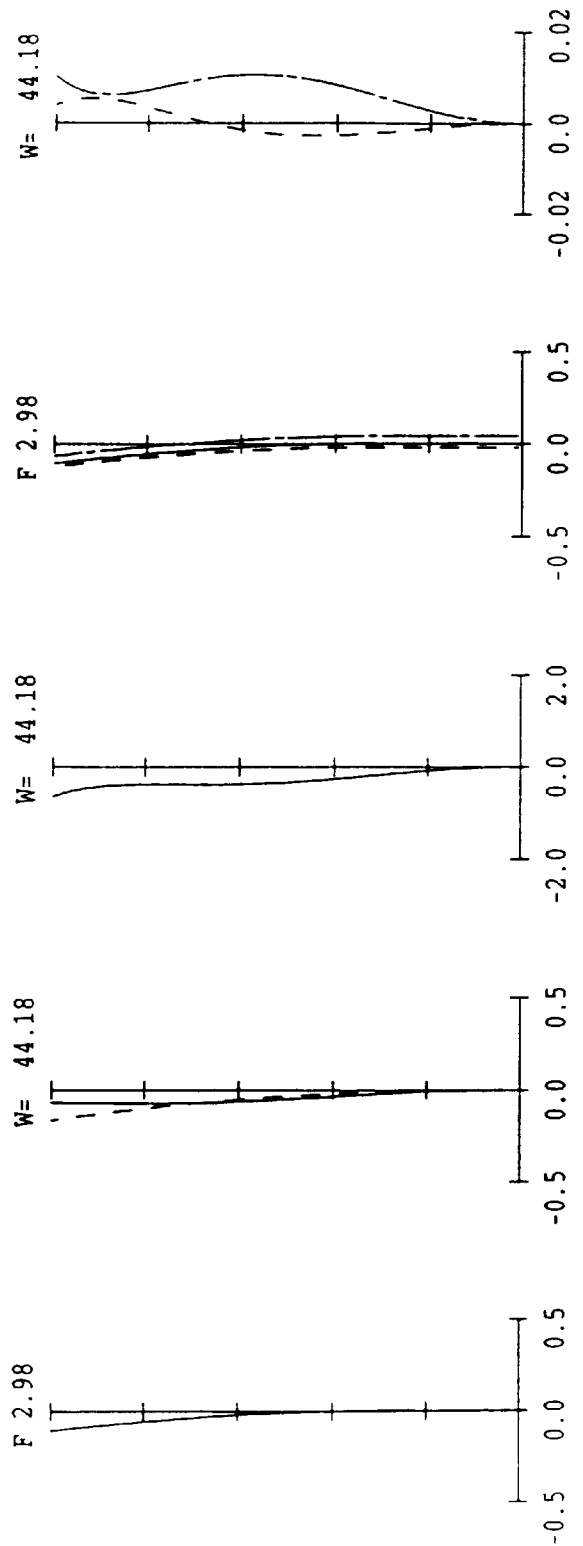
FIGS. 10a–10e is an aberration graph of the projection lens of Example 5.

FIGS. 10 (a), (b), (c), (d) and (e) show the spherical aberration (mm), astigmatism (mm), distortion aberration (%), axial chromatic aberration (mm) and magnification chromatic aberration (mm) of Example 5, respectively. The graphs in FIG. 10 are plotted in the same manner as in FIG. 2.

TABLE 5

| | | | | |
|---|---|---|---|---|
| | f0 = 10.32, diameter ratio 1:3.0, ω = 44° | | | |
| | ndI1—ndI2 = −0.02944 | | | |
| | vdI1−vdI2 = 22.85 | | | |
| | ndII1−ndII2 = 0.00092 | | | |
| | vdII1−vdII2 = 7.81 | | | |
| | PgFII1−PgFII2 = −0.0273 | | | |
| | f0/fI = −0.28 | | | |
| | f0/fII = 0.02 | | | |
| | f0/fIII = 0.36 | | | |
| radius of curvature (mm) | distance between surfaces in axis direction (mm) | Nd | vd | PgF |

TABLE 5-continued

| | | | | |
|---|---|---|---|---|
| r1 = 55.786 | d1 = 3.0 | n1 = 1.61800 | ν1 = 63.39 | PgF1 = 0.5405 |
| r2 = 21.613 | d2 = 13.8 | | | |
| r3 = 2869.452 | d3 = 3.0 | n2 = 1.61800 | ν2 = 63.39 | PgF2 = 0.5405 |
| r4 = 29.150 | d4 = 5.0 | | | |
| r5 = 222.869 | d5 = 5.0 | n3 = 1.75520 | ν3 = 27.53 | PgF3 = 0.6030 |
| r6 = −57.787 | d6 = 0.7 | | | |
| r7 = 51.256 | d7 = 4.5 | n4 = 1.49153 | ν4 = 57.15 | PgF4 = 0.5430 |
| r8 = 31.655 | d8 = 19.7 | | | |
| r9 = −39.029 | d9 = 2.0 | n5 = 1.51821 | ν5 = 65.05 | PgF5 = 0.5338 |
| r10 = 12.688 | d10 = 5.5 | n6 = 1.54765 | ν6 = 42.20 | PgF6 = 0.5808 |
| r11 = −88.244 | d11 = 1.3 | | | |
| r12 = 163.305 | d12 = 4.5 | n7 = 1.80610 | ν7 = 33.27 | PgF7 = 0.5883 |
| r13 = −45.704 | d13 = 1.5 | n8 = 1.80518 | ν8 = 25.46 | PgF8 = 0.6156 |
| r14 = 111.184 | d14 = 1.0 | | | |
| r15 = 60.988 | d15 = 3.5 | n9 = 1.49153 | ν9 = 57.15 | PgF9 = 0.5430 |
| r16 = −303.370 | d16 = 7.2 | | | |
| r17 = 0.000 | d17 = 16.7 | | | |
| r18 = −78.575 | d18 = 2.0 | n10 = 1.68893 | ν10 = 31.16 | PgF10 = 0.5943 |
| r19 = 102.802 | d19 = 1.1 | n11 = 1.49700 | ν11 = 81.61 | PgF11 = 0.5387 |
| r20 = −17.522 | d20 = 0.7 | | | |
| r21 = −32.293 | d21 = 3.0 | n12 = 1.49153 | ν12 = 57.15 | PgF12 = 0.5430 |
| r22 = −1741.411 | d22 = 1.1 | | | |
| r23 = 59.402 | d23 = 8.0 | n13 = 1.49700 | ν13 = 81.61 | PgF13 = 0.5387 |
| r24 = −21.080 | d24 = 5.0 | | | |
| r25 = 0.0 | d25 = 24.0 | n14 = 1.51680 | ν14 = 64.20 | PgF14 = 0.5342 |
| r26 = 0.0 | d26 = 13.1 | | | |

The coefficients of the aspherical surfaces of the aspherical lenses are shown below.

The coefficient of the aspherical surface of the 8th surface:

a4 = −2.90129e-5
a6 = −4.19731e-8
a8 = −1.92689e-11 a10 = 1.46061e-13
The coefficient of the aspherical surface of the 16th surface:

a4 = 3.53567e-5
a6 = −4.97498e-7
a8 = 2.18089e-8 a10 = −3.08225e-10
The coefficient of the aspherical surface of the 21st surface:

a4 = −4.01768e-5
a6 = −7.32717e-8
a8 = 1.49014e-10 a10 = −3.26768e-12
The coefficient of the aspherical surface of the 22nd surface:

a4 = 2.75909e-6
a6 = 3.49495e-8
a8 = 0.0
a10 = 0.0

Example 6

Hereinafter, Embodiment 1 will be described by Example 6 as another example with specific values.

Figure 11:
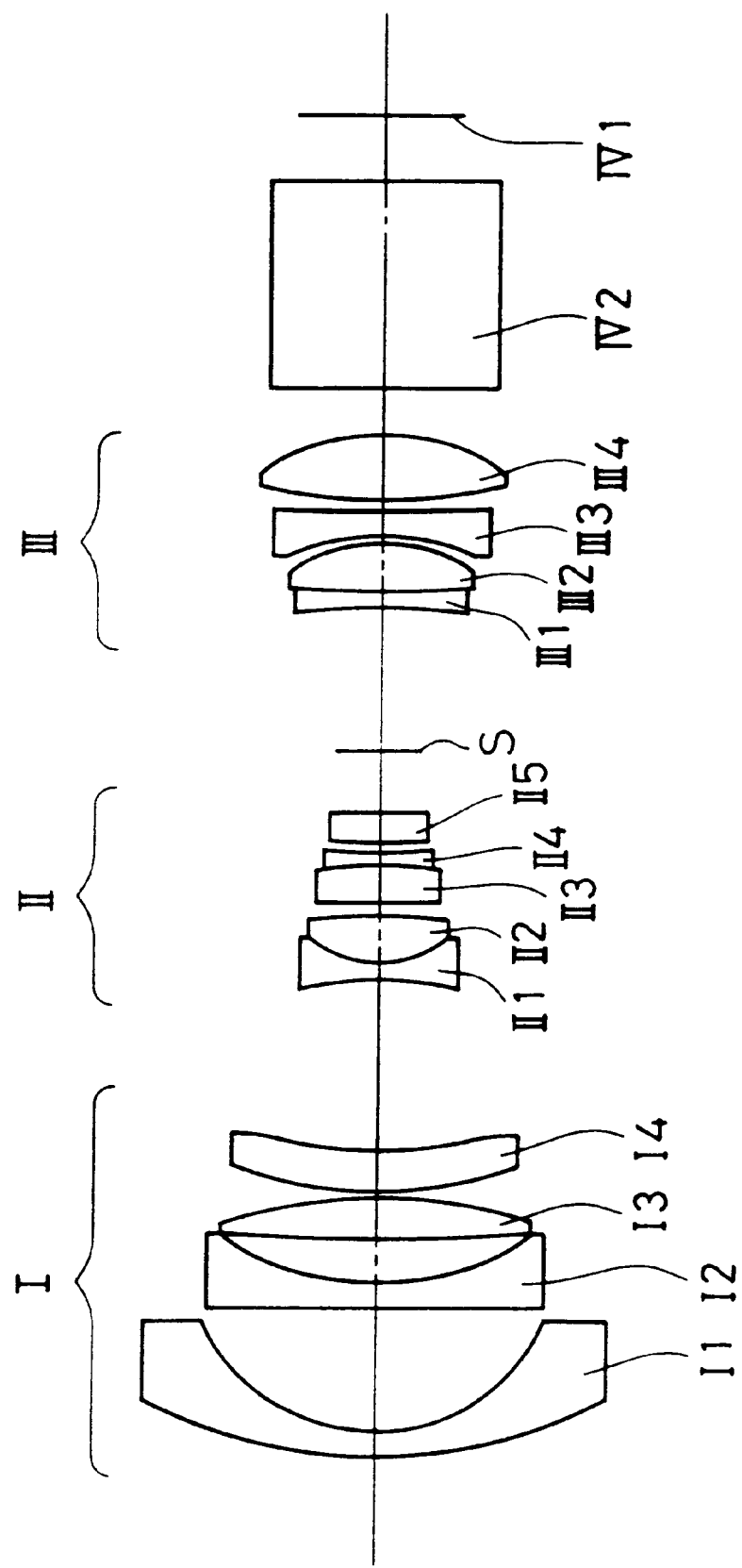
FIG. 11 is a configuration diagram of a projection lens according to Example 6 of Embodiment 1 of the present invention.
Figure 12E:
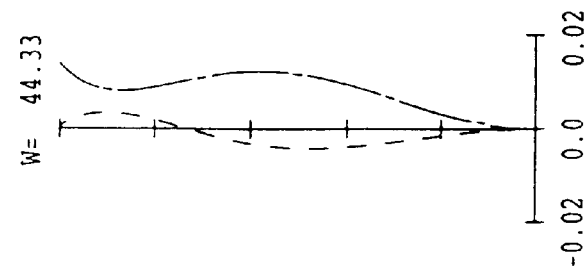
FIGS. 12a–12e is an aberration graph of the projection lens of Example 6.
Figure 12D:
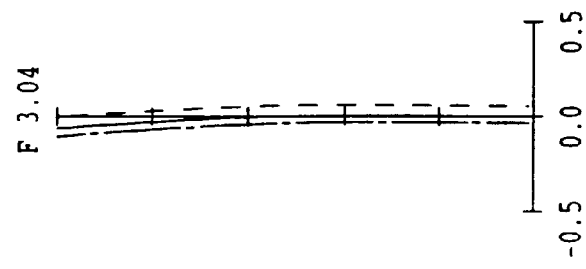
Figure 12C:
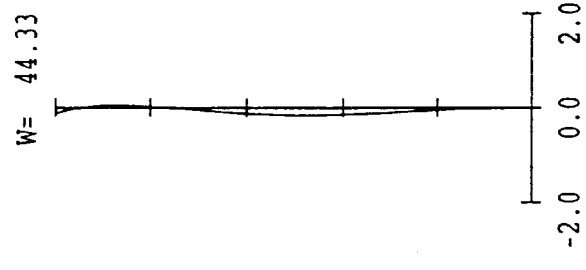
Figure 12B:
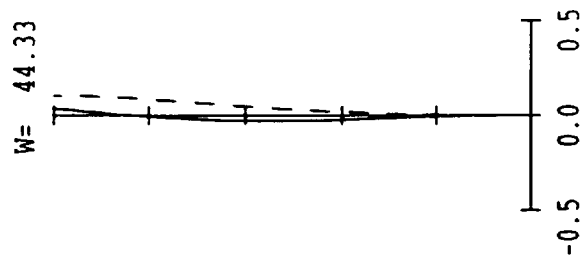
Figure 12A:

FIG. 11 is a configuration diagram of the projection lens according to Example 6 of Embodiment 1. The components that have the same functions as those in FIG. 1 bear the same symbols.

Example 6 is a projection lens having $F_{NO}$=3.0, a focal length f=10.52, and a half angle of view ω=44°. This example is designed for the purpose of having a long back focal length and telecentric properties, and correcting the magnification chromatic aberration and the distortion aberration by satisfying the relationships (1) to (5).

Table 6 shows specific values. The symbols in Table 6 represent the same as those in Table 1 of Example 1.

FIGS. 12 (*a*), (*b*), (*c*), (*d*) and (*e*) show the spherical aberration (mm), astigmatism (mm), distortion aberration (%), axial chromatic aberration (mm) and magnification chromatic aberration (mm) of Example 2, respectively. The graphs in FIG. 12 are plotted in the same manner as in FIG. 2.

TABLE 6

$f0 = 10.52$, diameter ratio 1:3.0, $\omega = 44°$
$ndI1 - ndI2 = -0.01388$
$vdI1 - vdI2 = 13.98$
$ndII1 - ndII2 = -0.0384$
$vdII1 - vdII2 = 11.38$
$PgFII1 - PgFII2 = -0.0304$
$f0/fI = -0.28$
$f0/fII = 0.02$
$f0/fIII = 0.36$

| radius of curvature (mm) | distance between surfaces in axis direction (mm) | Nd | vd | PgF |
|---|---|---|---|---|
| r1 = 55.786 | d1 = 3.0 | n1 = 1.61800 | v1 = 63.39 | PgF1 = 0.5405 |
| r2 = 21.613 | d2 = 13.8 | | | |
| r3 = 2869.452 | d3 = 3.0 | n2 = 1.61800 | v2 = 63.39 | PgF2 = 0.5405 |
| r4 = 29.150 | d4 = 5.0 | | | |
| r5 = 222.869 | d5 = 5.0 | n3 = 1.76180 | v3 = 26.91 | PgF3 = 0.6064 |
| r6 = −57.787 | d6 = 0.7 | | | |
| r7 = 51.256 | d7 = 4.5 | n4 = 1.49153 | v4 = 57.15 | PgF4 = 0.5430 |
| r8 = 31.655 | d8 = 19.7 | | | |
| r9 = 39.029 | d9 = 2.0 | n5 = 1.48749 | v5 = 70.44 | PgF5 = 0.5303 |
| r10 = 10.600 | d10 = 5.5 | n6 = 1.50137 | v6 = 56.46 | PgF6 = 0.5450 |
| r11 = −98.363 | d11 = 1.3 | | | |
| r12 = 163.305 | d12 = 4.5 | n7 = 1.72342 | v7 = 37.99 | PgF7 = 0.5819 |
| r13 = −39.733 | d13 = 1.5 | n8 = 1.76182 | v8 = 26.61 | PgF8 = 0.6123 |
| r14 = 132.483 | d14 = 1.0 | | | |
| r15 = 60.988 | d15 = 3.5 | n9 = 1.49153 | v9 = 57.15 | PgF9 = 0.5430 |
| r16 = −303.370 | d16 = 7.2 | | | |
| r17 = 0.000 | d17 = 16.7 | | | |
| r18 = −78.575 | d18 = 2.0 | n10 = 1.75523 | v10 = 27.53 | PgF10 = 0.6030 |
| r19 = 128.936 | d19 = 1.1 | n11 = 1.49700 | v11 = 81.61 | PgF11 = 0.5387 |
| r20 = −17.522 | d20 = 0.7 | | | |
| r21 = −32.293 | d21 = 3.0 | n12 = 1.49153 | v12 = 57.15 | PgF12 = 0.5430 |
| r22 = −1741.411 | d22 = 1.1 | | | |
| r23 = 59.402 | d23 = 8.0 | n13 = 1.49700 | v13 = 81.61 | PgF13 = 0.5387 |
| r24 = −21.080 | d24 = 5.0 | | | |
| r25 = 0.0 | d25 = 24.0 | n14 = 1.51680 | v14 = 64.20 | PgF14 = 0.5342 |
| r26 = 0.0 | d26 = 13.10 | | | |

The coefficients of the aspherical surfaces of the aspherical lenses are shown below.

The coefficient of the aspherical surface of the 8th surface:

$a4 = -2.90129e-5$
$a6 = -4.19731e-8$
$a8 = -1.92689e-11$
$a10 = 1.46061e-13$

The coefficient of the aspherical surface of the 16th surface:

$a4 = 3.53567e-5$
$a6 = -4.97498e-7$
$a8 = 2.18089e-8$
$a10 = -3.08225e-10$

The coefficient of the aspherical surface of the 21st surface:

$a4 = -4.01768e-5$
$a6 = -7.32717e-8$
$a8 = 1.49014e-10$
$a10 = -3.26768e-12$

The coefficient of the aspherical surface of the 22nd surface:

$a4 = 2.75909e-6$
$a6 = 3.49495e-8$
$a8 = 0.0$
$a10 = 0.0$

Embodiment 2

A projection lens according to Embodiment 2 of the present invention will be described with reference to the accompanying drawings.

Figure 13:
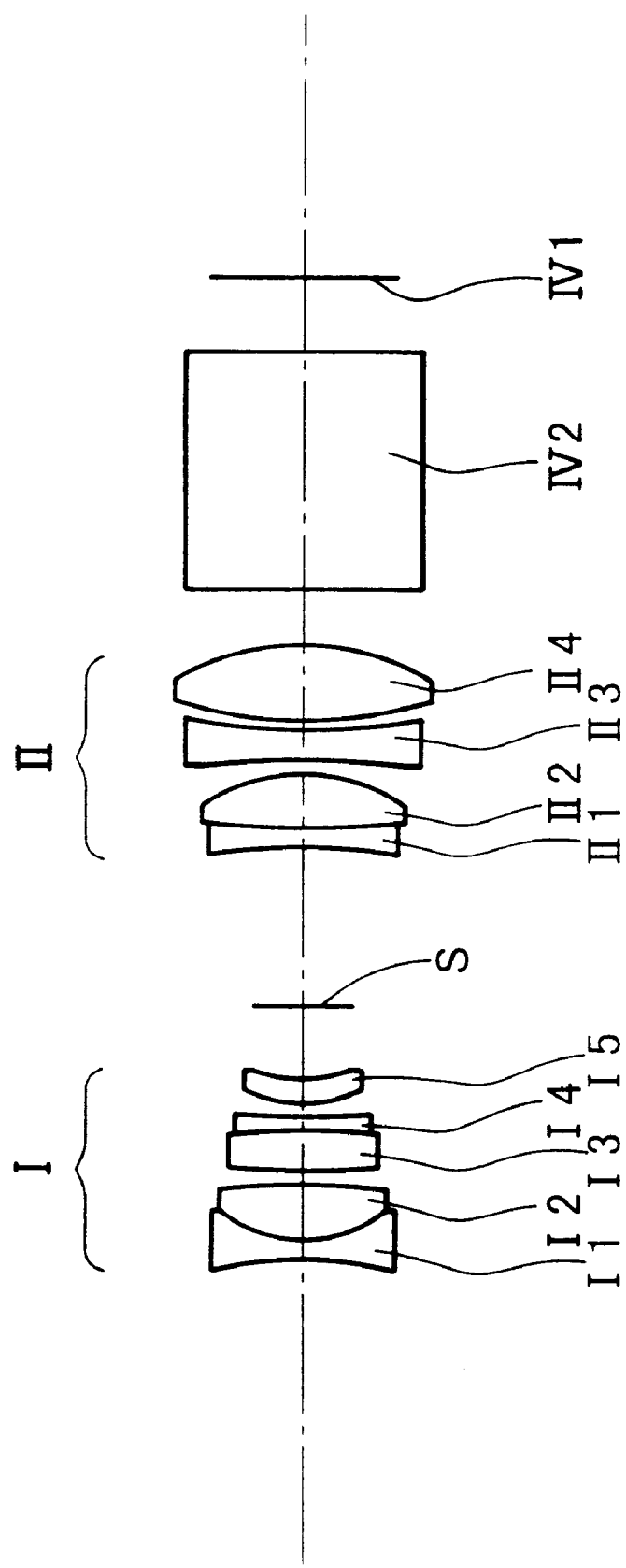
FIG. 13 is a configuration diagram of a projection lens according to Example 7 of Embodiment 2 of the present invention.
Figure 14A:
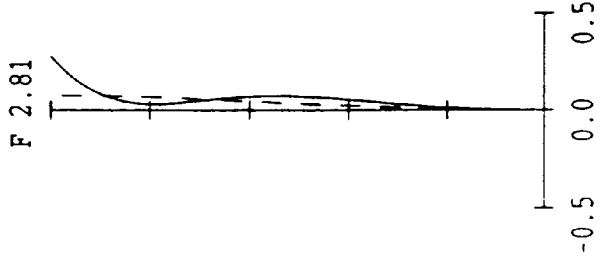
FIGS. 14a–14e is an aberration graph of the projection lens of Example 7.
Figure 14B:
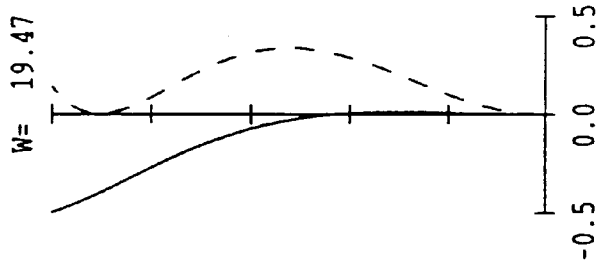
Figure 14C:
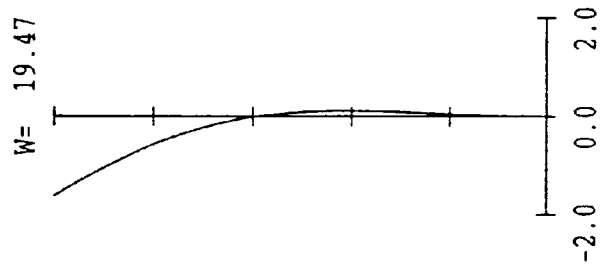
Figure 14D:
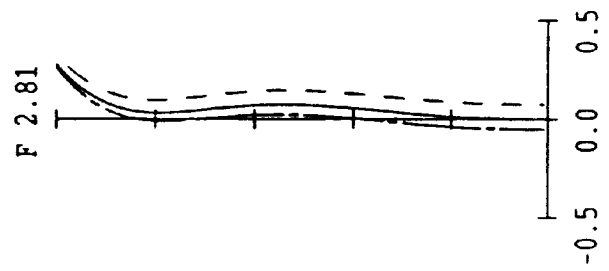
Figure 14E:
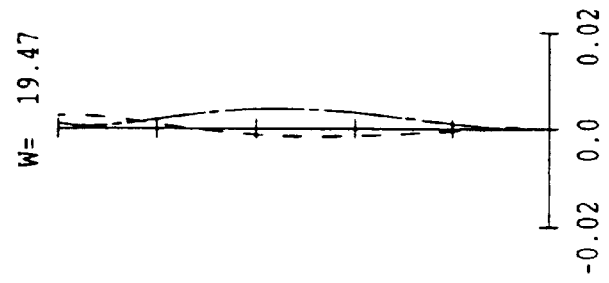

FIG. 13 is a configuration diagram of a projection lens according to Embodiment 2.

Referring to FIG. 13, a screen (not shown) is arranged on the left side of the drawing.

The 1st lens group I on the screen side has a weak power and corrects the magnification chromatic aberration. The 1st lens group I includes the first lens I1 to the fifth lens I5 in this order from the screen side. The first lens I1 of the 1st lens group is a negative lens having a low refractive index and a large Abbe number. The second lens I2 of the 1st lens group is a positive lens formed of glass having a small difference in the refractive index, a large difference in the Abbe number, and a small difference in the partial dispersion ratio with respect to the first lens I1. The first lens I1 and the second lens I2 are joined together so as to constitute the first-joined lens. It is preferable that the first lens I1 is formed of glass having an unusual partial dispersion, and that the first lens I1 and the second lens I2 have a small difference in the partial dispersion ratio. The third lens I3 of the 1st lens group is a positive lens having a small Abbe number and a high refractive index, and the fourth lens I4 of the 1st lens group is a negative lens formed of glass having a small difference in the Abbe number, a small difference in the refractive index and a large difference in the partial dispersion ratio with respect to the third lens I3. The third lens I3 and the fourth lens I4 are joined together so as to constitute the second joined lens. The fifth lens I5 of the 1st lens group I is a positive lens with an aspherical surface.

The 2nd lens group II has a positive power and achieves telecentric properties. In the 2nd lens group II, the principal ray is in a high position, so that a large distortion aberration is generated. For this reason, an aspherical lens is added to correct the distortion aberration. The 2nd lens group II includes a negative lens II1 having a high refractive index and a small Abbe number, a positive lens II2 having a low refractive index and a large Abbe number, a negative lens II3 with an aspherical surface, and a positive lens II4 having a low refractive index and a large Abbe number in this order from the screen side. The negative lens II1 and the positive lens II2 are joined.

An aperture stop S is arranged between the 1st lens group I and the 2nd lens group II.

Further, a spatial optical modulator IV1 is arranged on the side opposite to the screen of the 2nd lens group II, and a prism IV2 is arranged between the spatial optical modulator IV1 and the lens groups.

In this manner, the prism IV2 intervenes between the spatial optical modulator IV and the projection lenses I and II, and therefore a long spatial gap is required between the spatial optical modulator IV1 and the lenses. In order words, a long back focal length is required. In addition, good telecentric properties are required to prevent non-uniformity in color or brightness due to the dependence on the angle of incidence from the prism IV2. According to the present embodiment, a long back focal length and telecentric properties are achieved together with compactness, and the distortion aberration and the magnification chromatic aberration are corrected successfully.

The projection lens of Embodiment 2 satisfies the following relationships (1) to (5):

(1) $-0.04 < ndI1 - ndI2 < -0.003$ (2) $13.9 < vdI1 - vdI2 < 31$ (3) $-0.039 < ndII1 - ndII2 < 0.001$ (4) $0.8 < vdII1 - vdII2 < 11.5$ (5) $-0.033 < PgFII1 - PgFII2 < -0.009$ where ndI1 represents the refractive index of the negative lens I1 of the first joined lens of the 1st lens group I, ndI2 represents the refractive index of the positive lens I2 of the first joined lens, vdI1 represents the Abbe number of the negative lens I1 of the first joined lens, vdI2 represents the Abbe number of the positive lens I2 of the first joined lens, ndII1 represents the refractive index of the positive lens I3 of the second joined lens, ndII2 represents the refractive index of the negative lens I4 of the second joined lens, vdII1 represents the Abbe number of the positive lens I3 of the second joined lens, vdII2 represents the Abbe number of the negative lens I4 of the second joined lens, PgFII1 represents the partial dispersion ratio (ng-nF)/(nF-nC) with respect to the g-line and the F-line of the positive lens I3 of the second joined lens, and PgFII2 represents the partial dispersion ratio (ng-nF)/(nF-nC) with respect to the g-line and the F-line of the negative lens I4 of the second joined lens.

Inequality (1) relates to the difference in the refractive index between the negative lens and the positive lens of the first joined lens. When the difference is below the lower limit, the correction is not successful due to the undercorrection of astigmatism. When the difference is above the upper limit, the correction is not successful due to the overcorrection of astigmatism.

Inequality (2) relates to the difference in the Abbe number between the negative lens and the positive lens of the first joined lens. When the difference is below the lower limit, the correction is not successful due to the undercorrection of the first-order magnification chromatic aberration. When the difference is above the upper limit, there is no combination of existent lenses.

Inequality (3) relates to the difference in the refractive index between the positive lens and the negative lens of the second joined lens. When the difference is below the lower limit, the correction is not successful due to the overcorrection of astigmatism. When the difference is above the upper limit, there is no combination of existent lenses that satisfies the relationships (4) and (5) at the same time.

Inequality (4) relates to the difference in the Abbe number between the positive lens and the negative lens of the second joined lens. When the difference is below the lower limit, there is no combination of existent lenses that satisfies the relationships (3) and (5) at the same time. When the difference is above the upper limit, the correction is not successful due to the undercorrection of the first-order magnification chromatic aberration.

Inequality (5) relates to the difference in the partial dispersion ratio with respect to the g-line and the F-line between the positive lens and the negative lens of the second joined lens. When the difference is below the lower limit, there is no combination of existent lenses that satisfies the relationships (3) and (4) at the same time. When the difference is above the upper limit, the correction is not successful due to the undercorrection of the second-order magnification chromatic aberration.

Hereinafter, Embodiment 2 will be described by Example 7 with specific values.

Example 7

FIG. 13 is a configuration diagram of the projection lens according to Example 7 of Embodiment 2.

Example 7 is a projection lens having $F_{NO}$=2.8, a focal length f=26.83, and a half angle of view ω=19°. This example is designed for the purpose of having a long back focal length and telecentric properties and correcting the magnification chromatic aberration and the distortion aberration by satisfying the relationships (1) to (5).

Table 7 shows specific values. The symbols in Table 7 represent the same as those in Table 1 of Example 1.

FIGS. 14 (*a*), (*b*), (*c*), (*d*) and (*e*) show the spherical aberration (mm), astigmatism (mm), distortion aberration (%), axial chromatic aberration (mm) and magnification chromatic aberration (mm) of Example 7, respectively. The graphs in FIG. 14 are plotted in the same manner as in FIG. 2.

example is designed for the purpose of having a long back focal length and telecentric properties, and correcting the magnification chromatic aberration and the distortion aberration by satisfying the relationships (1) to (5).

Table 8 shows specific values. The symbols in Table 8 represent the same as those in Table 1 of Example 1.

Figure 16:
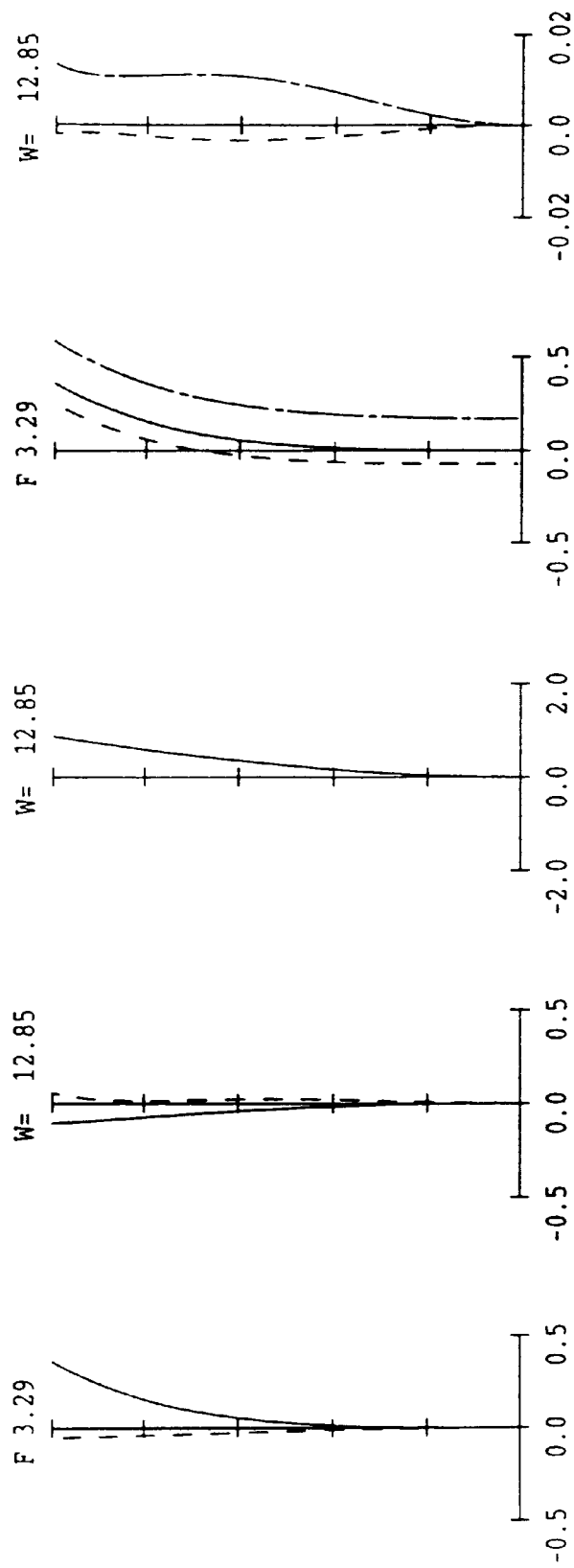
FIGS. 16a–16e is an aberration graph of the projection lens of Example 8.

FIGS. 16 (*a*), (*b*), (*c*), (*d*) and (*e*) show the spherical aberration (mm), astigmatism (mm), distortion aberration (%), axial chromatic aberration (mm) and magnification chromatic aberration (mm) of Example 8, respectively. The graphs in FIG. 16 are plotted in the same manner as in FIG. 2.

TABLE 7 f0 = 26.83, diameter ratio 1:2.8, ω =19°
ndI1-ndI2 = −0.00437
vdI1-vdI2 = 25.14
ndII1-ndII2 = −0.01232
vdII1-vdII2 = 8.39
PgFII1-PgFII2 = −0.02183

| radius of curvature (mm) | distance between surfaces in axis direction (mm) | Nd | vd | PgF |
|---|---|---|---|---|
| r1 = −39.82 | d1 = 2.0 | n1 = 1.49700 | v1 = 81.50 | PgF1 = 0.5387 |
| r2 = 12.676 | d2 = 5.6 | n2 = 1.50137 | v2 = 56.46 | PgF2 = 0.5450 |
| r3 = −55.012 | d3 = 1.3 | | | |
| r4 = 204.097 | d4 = 4.0 | n3 = 1.74950 | v3 = 35.00 | PgF3 = 0.5905 |
| r5 = −68.884 | d5 = 1.5 | n4 = 1.76182 | v4 = 26.61 | PgF4 = 0.6123 |
| r6 = 82.400 | d6 = 1.0 | | | |
| r7 = 16.406 | d7 = 2.6 | n5 = 1.49153 | v5 = 57.15 | PgF5 = 0.5430 |
| r8 = 21.705 | d8 = 7.2 | | | |
| r9 = 0.000 | d9 = 15.6 | | | |
| r10 = −51.602 | d10 = 2.0 | n6 = 1.75523 | v6 = 27.53 | PgF6 = 0.6030 |
| r11 = 110.192 | d11 = 5.4 | n7 = 1.49700 | v7 = 81.61 | PgF7 = 0.5387 |
| r12 = −17.210 | d12 = 1.2 | | | |
| r13 = 265.041 | d13 = 3.0 | n8 = 1.49153 | v8 = 57.15 | PgF8 = 0.5430 |
| r14 = 35.900 | d14 = 1.1 | | | |
| r15 = 42.141 | d15 = 8.2 | n9 = 1.49700 | v9 = 81.61 | PgF9 = 0.5387 |
| r16 = −22.378 | d16 = 5.0 | | | |
| r17 = 0.0 | d17 = 24.0 | n10 = 1.51680 | v10 = 64.20 | PgF10 = 0.5342 |
| r18 = 0.0 | d18 = 6.5 | | | |

The coefficients of the aspherical surfaces of the aspherical lenses are shown below.
The coefficient of the aspherical surface of the 7th surface:
a4 = 3.04391e-4
a6 = 2.64606e-6
a8 = −5.23657e-8
a10 = 2.05862e-9
The coefficient of the aspherical surface of the 13th surface:
a4 = −4.12794e-5
a6 = −5.69746e-9
a8 = −3.27030e-9
a10 = 1.20210e-11
The coefficient of the aspherical surface of the 14th surface:
a4 = −6.08462e-6
a6 = −2.01129e-7
a8 = −9.13674e-11
a10 = 3.323249e-12

Example 8

Hereinafter, Embodiment 2 will be described by Example 8 as another example with specific values.

Figure 15:
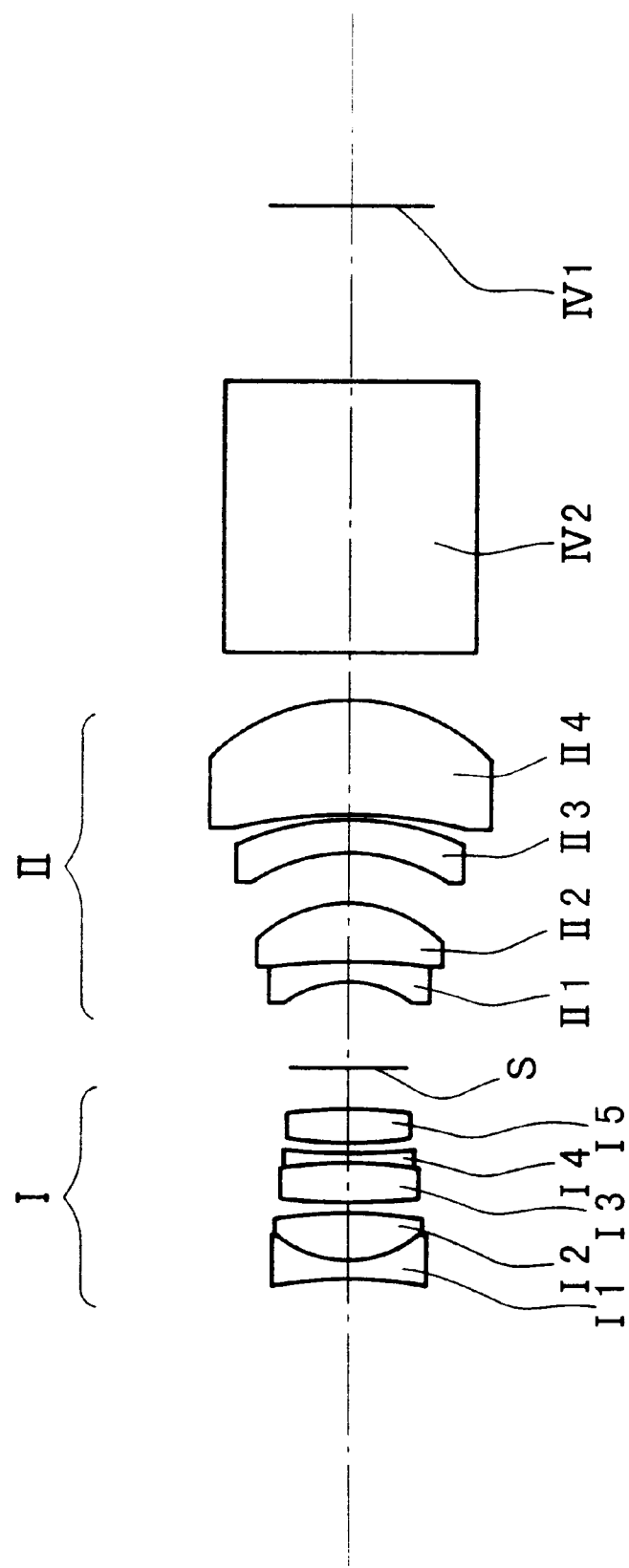
FIG. 15 is a configuration diagram of a projection lens according to Example 8 of Embodiment 2 of the present invention.

FIG. 15 is a configuration diagram of the projection lens according to Example 8 of Embodiment 2. The components that have the same functions as those in FIG. 13 bear the same symbols.

Example 8 is a projection lens having $F_{NO}$=3.3, a focal length f=40.71, and a half angle of view ω=120. This

TABLE 8 f0 = 40.71, diameter ratio 1:3.3, ω =12°
ndI1-ndI2 = −0.00437
vdI1-vdI2 = 25.14
ndII1-ndII2 = −0.01232
vdII1-vdII2 = 8.39
PgFII1-PgFII2 = −0.02183

| radius of curvature (mm) | distance between surfaces in axis direction (mm) | Nd | vd | PgF |
| --- | --- | --- | --- | --- |
| r1 = −39.82 | d1 = 2.0 | n1 = 1.49700 | v1 = 81.50 | PgF1 = 0.5387 |
| r2 = 12.676 | d2 = 5.6 | n2 = 1.50137 | v2 = 56.46 | PgF2 = 0.5450 |
| r3 = −55.012 | d3 = 1.3 | | | |
| r4 = 204.097 | d4 = 4.0 | n3 = 1.74950 | v3 = 35.00 | PgF3 = 0.5905 |
| r5 = −68.884 | d5 = 1.5 | n4 = 1.76182 | v4 = 26.61 | PgF4 = 0.6123 |
| r6 = 82.400 | d6 = 1.0 | | | |
| r7 = 64.956 | d7 = 4.0 | n5 = 1.688893 | v5 = 31.16 | PgF5 = 0.5943 |
| r8 = −49.121 | d8 = 4.5 | | | |
| r9 = 0.000 | d9 = 10.0 | | | |
| r10 = −11.222 | d10 = 2.0 | n6 = 1.78472 | v6 = 25.70 | PgF6 = 0.6119 |
| r11 = −83.959 | d11 = 7.1 | n7 = 1.62299 | v7 = 58.12 | PgF7 = 0.5438 |
| r12 = −14.648 | d12 = 5.5 | | | |
| r13 = −21.545 | d13 = 4.2 | n8 = 1.51645 | v8 = 56.01 | PgF8 = 0.5347 |
| r14 = −22.559 | d14 = 0.5 | | | |
| r15 = −51.388 | d15 = 13.3 | n9 = 1.62299 | v9 = 58.12 | PgF9 = 0.5438 |
| r16 = −21.832 | d16 = 5.2 | | | |
| r17 = 0.0 | d17 = 31.5 | n10 = 1.51680 | v10 = 64.20 | PgF10 = 0.5342 |
| r18 = 0.0 | d18 = 20.1 | | | |

The coefficients of the aspherical surfaces of the aspherical lenses are shown below.
The coefficient of the aspherical surface of the 7th surface:
a4 = 4.90005e-6
a6 = 0.0
a8 = 0.0
a10 = 0.0
The coefficient of the aspherical surface of the 14th surface:
a4 = 2.97306e-5
a6 = 5.67811e-8
a8 = 2.12862e-10
a10 = −5.60088e-13

Embodiment 3

A projection lens according to Embodiment 3 of the present invention will be described with reference to the accompanying drawings.

Figure 17:
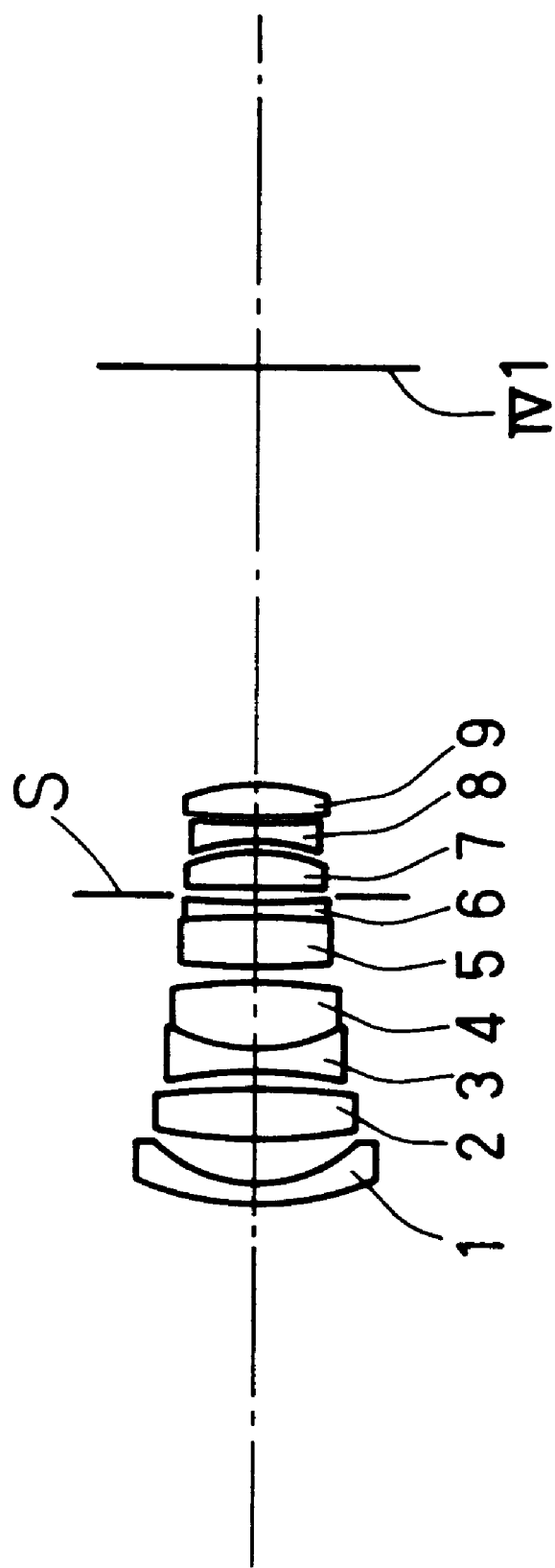
FIG. 17 is a configuration diagram of a projection lens according to Example 9 of Embodiment 3 of the present invention.

FIG. 17 is a configuration diagram of a projection lens according to Embodiment 3.

Referring to FIG. 17, a screen (not shown) is arranged on the left side of the drawing.

The projection lens of this embodiment includes the first lens to the ninth lens in this order from the screen side. The first lens 1 is a negative lens with a negative power, and the second lens 2 is a positive lens with a positive power. The third lens 3 is a negative lens having a low refractive index and a large Abbe number. The fourth lens 4 is a positive lens formed of glass having a small difference in the refractive index, a large difference in the Abbe number, and a small difference in the partial dispersion ratio with respect to the third lens 3. The third lens 3 and the fourth lens 4 are joined together so as to constitute the first joined lens. It is preferable that the third lens 3 is formed of glass having an unusual partial dispersion, and that the third lens 3 and the fourth lens 4 have a small difference in the partial dispersion ratio. The fifth lens 5 is a positive lens having a small Abbe number and a high refractive index, and the sixth lens 6 is a negative lens formed of glass having a small difference in the Abbe number, a small difference in the refractive index and a large difference in the partial dispersion ratio with respect to the fifth lens 5. The fifth lens 5 and the sixth lens 6 are joined together so as to constitute the second joined lens. The seventh lens 7 is a positive lens, the eight lens 8 is a negative lens, and the ninth lens is a positive lens.

An aperture stop S is arranged between the sixth lens and the seventh lens.

Further, a spatial optical modulator IV1 is arranged on the side opposite to the screen of the seventh lens.

According to the present embodiment, a long back focal length is achieved together with compactness, and since an optical system with an aperture stop back is provided, the lens diameter can be small. In addition, the magnification chromatic aberration is corrected successfully.

The projection lens of Embodiment 3 satisfies the following relationships (1) to (5):

(1) $-0.04 < ndI1-ndI2 < -0.003$ (2) $13.9 < vdI1-vdI2 < 31$ (3) $-0.039 < ndII1-ndII2 < 0.001$ (4) $0.8 < vdII1-vdII2 < 11.5$ (5) $-0.033 < PgFII1-PgFII2 < -0.009$ where ndI1 represents the refractive index of the negative lens 3 of the first joined lens, ndI2 represents the refractive index of the positive lens 4 of the first joined lens, vdI1 represents the Abbe number of the negative lens 3 of the first joined lens, vdI2 represents the Abbe number of the positive lens 4 of the first joined lens, ndII1 represents the refractive index of the positive lens 5 of the second joined lens, ndII2 represents the refractive index of the negative lens 6 of the second joined lens, vdII1 represents the Abbe number of the positive lens 5 of the second joined lens, vdII2 represents the Abbe number of the negative lens 6 of the second joined lens, PgFII1 represents the partial dispersion ratio (ng-nF)/(nF-nC) with respect to the g-line and the F-line of the positive lens 5 of the second joined lens, and PgFII2 represents the partial dispersion ratio (ng-nF)/(nF-nC) with respect to the g-line and the F-line of the negative lens 6 of the second joined lens.

Inequality (1) relates to the difference in the refractive index between the negative lens and the positive lens of the first joined lens. When the difference is below the lower limit, the correction is not successful due to the undercorrection of astigmatism. When the difference is above the upper limit, the correction is not successful due to the overcorrection of astigmatism.

Inequality (2) relates to the difference in the Abbe number between the negative lens and the positive lens of the first joined lens. When the difference is below the lower limit, the correction is not successful due to the undercorrection of the first-order magnification chromatic aberration. When the difference is above the upper limit, there is no combination of existent lenses.

Inequality (3) relates to the difference in the refractive index between the positive lens and the negative lens of the second joined lens. When the difference is below the lower limit, the correction is not successful due to the overcorrection of astigmatism. When the difference is above the upper limit, there is no combination of existent lenses that satisfies the relationships (4) and (5) at the same time.

Inequality (4) relates to the difference in the Abbe number between the positive lens and the negative lens of the second joined lens. When the difference is below the lower limit, there is no combination of existent lenses that satisfies the relationships (3) and (5) at the same time. When the difference is above the upper limit, the correction is not successful due to the undercorrection of the first-order magnification chromatic aberration.

Inequality (5) relates to the difference in the partial dispersion ratio with respect to the g-line and the F-line between the positive lens and the negative lens of the second joined lens. When the difference is below the lower limit, there is no combination of existent lenses that satisfies the relationships (3) and (4) at the same time. When the difference is above the upper limit, the correction is not successful due to the undercorrection of the second-order magnification chromatic aberration.

Hereinafter, Embodiment 3 will be described by Example 9 with specific values.

Example 9

FIG. 17 is a configuration diagram of the projection lens according to Example 9 of Embodiment 3.

Example 9 is a projection lens having $F_{NO}=3.3$, a focal length f=28.10, and a half angle of view $\omega=25°$. This example is designed for the purpose of having a long back focal length and a small lens diameter by constituting an optical system with an aperture stop back, and correcting the magnification chromatic aberration by satisfying the relationships (1) to (5).

Table 9 shows specific values. The symbols in Table 9 represent the same as those in Table 1 of Example 1.

Figure 18:
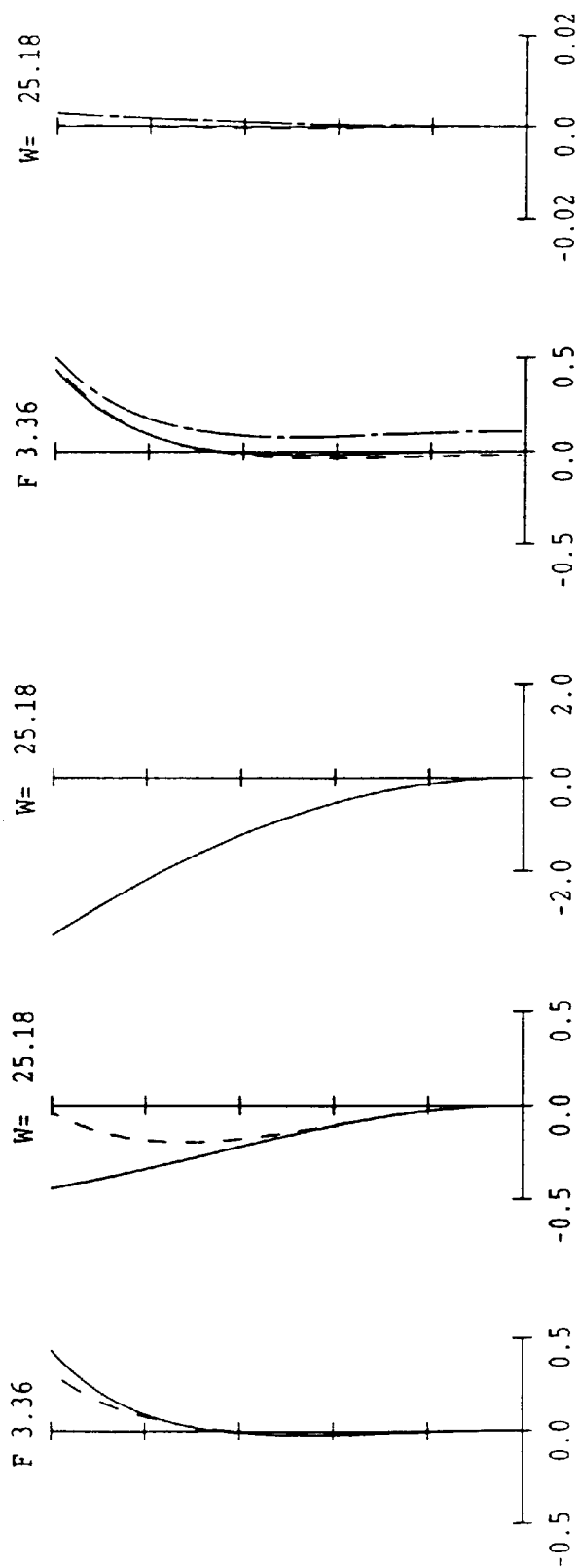
FIGS. 18a–18e is an aberration graph of the projection lens of Example 9.

FIGS. 18 (a), (b), (c), (d) and (e) show the spherical aberration (mm), astigmatism (mm), distortion aberration (%), axial chromatic aberration (mm) and magnification chromatic aberration (mm) of Example 9, respectively. The graphs in FIG. 18 are plotted in the same manner as in FIG. 2.

TABLE 9 f0 = 28.10, diameter ratio 1:3.3, $\omega$ =25°
ndI1-ndI2 = −0.00437
vdI1-vdI2 = 25.14
ndII1-ndII2 = −0.01232
vdII1-vdII2 = 8.39
PgFII1-PgFII2 = −0.02183

| radius of curvature (mm) | distance between surfaces in axis direction (mm) | Nd | vd | PgF |
|---|---|---|---|---|
| r1 = 23.015 | d1 = 1.7 | n1 = 1.51454 | v1 = 54.70 | PgF1 = 0.5499 |
| r2 = 11.087 | d2 = 4.0 | | | |
| r3 = 57.851 | d3 = 4.0 | n2 = 1.77250 | v2 = 49.62 | PgF2 = 0.5503 |
| r4 = −79.932 | d4 = 1.2 | | | |
| r5 = −37.820 | d5 = 2.0 | n3 = 1.49700 | v3 = 81.50 | PgF3 = 0.5387 |
| r6 = 12.676 | d6 = 5.6 | n4 = 1.50137 | v4 = 56.46 | PgF4 = 0.5450 |
| r7 = −55.012 | d7 = 1.3 | | | |
| r8 = 204.097 | d8 = 4.0 | n5 = 1.74950 | v5 = 35.00 | PgF5 = 0.5905 |
| r9 = −68.864 | d9 = 1.5 | n6 = 1.76182 | v6 = 26.61 | PgF6 = 0.6123 |
| r10 = 82.400 | d10 = 1.0 | | | |
| r11 = −143.783 | d11 = 3.0 | n7 = 1.79450 | v7 = 45.39 | PgF7 = 0.5572 |
| r12 = −15.036 | d12 = 1.0 | | | |
| r13 = −11.978 | d13 = 1.5 | n8 = 1.69895 | v8 = 30.05 | PgF8 = 0.5994 |
| r14 = 48.703 | d14 = 0.4 | | | |
| r15 = 103.806 | d15 = 2.8 | n9 = 1.79450 | v9 = 45.39 | PgF9 = 0.5572 |
| r16 = −15.511 | d16 = 34.8 | | | |

Example 10

Hereinafter, Embodiment 3 will be described by Example 10 as another example with specific values.

Figure 19:
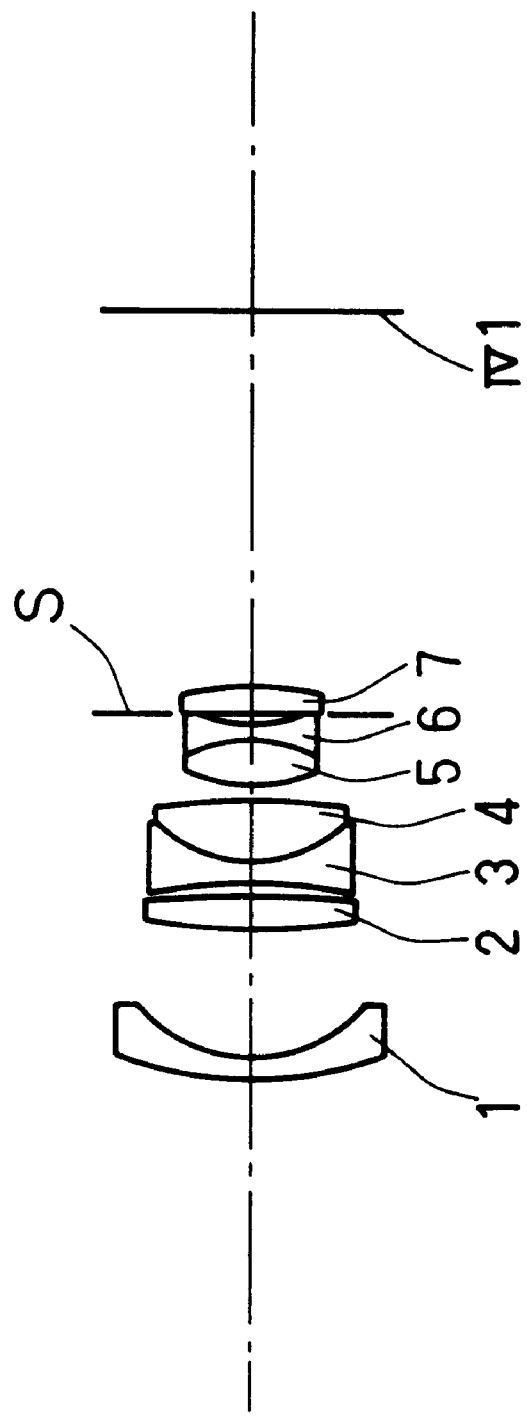
FIG. 19 is a configuration diagram of a projection lens according to Example 10 of Embodiment 3 of the present invention.

FIG. 19 is a configuration diagram of the projection lens according to Example 10 of Embodiment 3. The components that have the same functions as those in FIG. 17 bear the same symbols.

Example 10 is a projection lens having $F_{NO}$=3.0, a focal length=28.07, and a half angle of view ω=25°. This example is designed for the purpose of having a long back focal length and a small lens diameter by constituting an optical system with an aperture stop back, and correcting the magnification chromatic aberration by satisfying the relationships (1) to (5).

Table 10 shows specific values. The symbols in Table 10 represent the same as those in Table 1 of Example 1.

Figure 20:
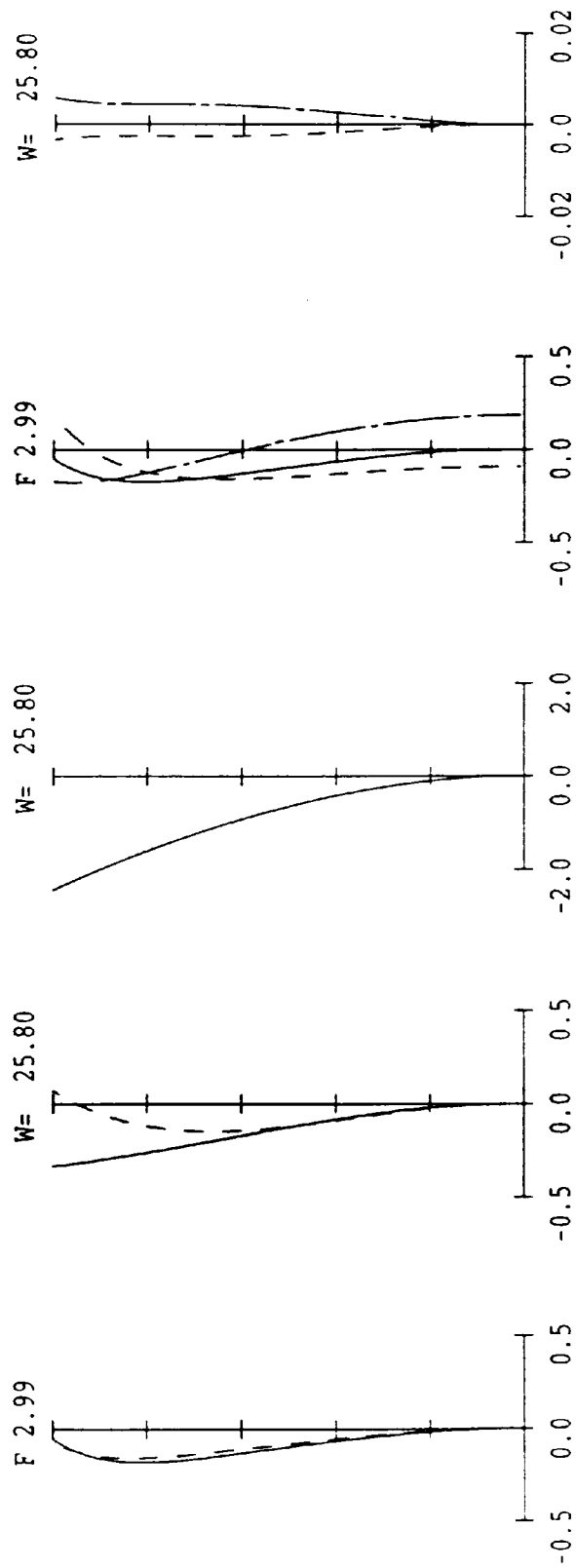
FIGS. 20a–20e is an aberration graph of the projection lens of Example 10.

FIGS. 20 (a), (b), (c), (d) and (e) show the spherical aberration (mm), astigmatism (mm), distortion aberration (%), axial chromatic aberration (mm) and magnification chromatic aberration (mm) of Example 10, respectively. The graphs in FIG. 20 are plotted in the same manner as in FIG. 2.

screen side. The first lens II1 of the $2^{nd}$ lens group is a positive lens having a low refractive index and a small Abbe number. The second lens II2 of the $2^{nd}$ lens group is a negative lens formed of glass having a small difference in the refractive index and a large difference in the Abbe number with respect to the first lens II1. The first lens II1 and the second lens II2 are joined. The third lens II3 of the $2^{nd}$ lens group is a positive lens with an aspherical surface.

The $3^{rd}$ lens group III has a positive power and achieves telecentric properties. In the $3^{rd}$ lens group III, the principal ray is in a high position, so that a large distortion aberration is generated. For this reason, an aspherical lens is added to correct the distortion aberration. The $3^{rd}$ lens group III includes a negative lens III1 having a high refractive index and a small Abbe number, a positive lens III2 having a low refractive index and a large Abbe number, a negative lens with an aspherical surface III3, and a positive lens III4 having a low refractive index and a large Abbe number in this order from the screen side. The negative lens III1 and the positive lens III2 are joined.

TABLE 10 f0 = 28.07, diameter ratio 1:3.0, ω =25°
ndI1-ndI2 = -0.00437
vdI1-vdI2 = 25.14
ndII1-ndII2 = -0.01232
vdII1-vdII2 = 8.39
PgFII1-PgFII2 = -0.02183

| radius of curvature (mm) | distance between surfaces in axis direction (mm) | Nd | vd | PgF |
|---|---|---|---|---|
| r1 = 36.225 | d1 = 1.7 | n1 = 1.51454 | v1 = 54.70 | PgF1 = 0.5499 |
| r2 = 12.702 | d2 = 11.9 | | | |
| r3 = 58.593 | d3 = 3.1 | n2 = 1.77250 | v2 = 49.62 | PgF2 = 0.5503 |
| r4 = -116.720 | d4 = 1.2 | | | |
| r5 = -37.820 | d5 = 2.0 | n3 = 1.49700 | v3 = 81.50 | PgF3 = 0.5387 |
| r6 = 12.676 | d6 = 5.6 | n4 = 1.50137 | v4 = 56.46 | PgF4 = 0.5450 |
| r7 = -55.012 | d7 = 1.3 | | | |
| r8 = 15.275 | d8 = 4.0 | n5 = 1.74950 | v5 = 35.00 | PgF5 = 0.5905 |
| r9 = -13.366 | d9 = 1.5 | n6 = 1.76182 | v6 = 26.61 | PgF6 = 0.6123 |
| r10 = 13.209 | d10 = 1.0 | | | |
| r11 = 629.970 | d11 = 2.8 | n7 = 1.79450 | v7 = 45.39 | PgF7 = 0.5572 |
| r12 = -24.150 | d12 = 34.2 | | | |

Embodiment 4

A projection lens according to Embodiment 4 of the present invention will be described with reference to the accompanying drawings.

Figure 21:
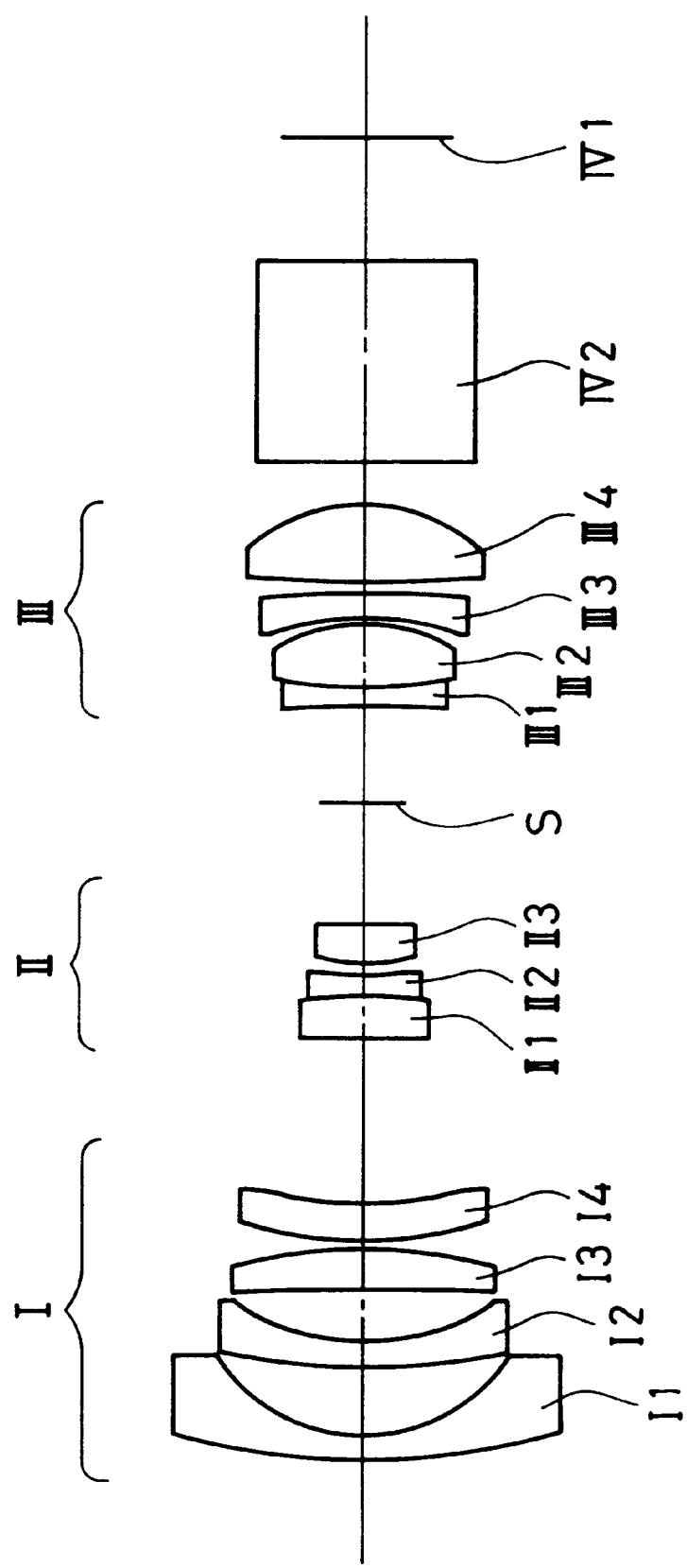
FIG. 21 is a configuration diagram of a projection lens according to Example 11 of Embodiment 4 of the present invention.

FIG. 21 is a configuration diagram of a projection lens according to Embodiment 4.

Referring to FIG. 21, a screen (not shown) is arranged on the left side of the drawing.

The It lens group I on the screen side has a strong negative power, so as to allow the axial ray to leap up significantly to ensure a back focus. Further, the $1^{st}$ lens group I advances the entrance pupil so that a large aperture efficiency can be achieved, and corrects the Petzval sum. The $1^{st}$ lens group I includes two negative lenses I1 and I2, a positive lens I3 for correction of chromatic aberration and distortion aberration, and an aspherical lens I4 for correction of distortion aberration.

The $2^{nd}$ lens group II has a weak power and corrects the axial chromatic aberration. The $2^{nd}$ lens group II includes the first lens II1 to the third lens II3 in this order from the An aperture stop S is arranged between the $2^{nd}$ lens group II and the $3^{rd}$ lens group III.

Further, a spatial optical modulator IV1 is arranged on the side opposite to the screen of the $3^{rd}$ lens group III, and a prism IV2 is arranged between the spatial optical modulator IV1 and the lens groups.

In this manner, the prism IV2 intervenes between the spatial optical modulator IV1 and the projection lenses I to III, and therefore a long spatial gap is required between the spatial optical modulator IV1 and the lenses. In order words, a long back focal length is required. In addition, good telecentric properties are required to prevent non-uniformity in color or brightness due to the dependence on the angle of incidence from the prism IV2. According to the present embodiment, a long back focal length and telecentric properties are achieved with a wide angle of a half angle of view of 44°, and he distortion aberration and the magnification chromatic aberration are corrected successfully.

The projection lens of Embodiment 4 satisfies the following relationships (9) to (11):

(9) $-0.35 < f0/fI < -0.27$

(10) $0.01 < f0/fII < 0.06$

(11) $0.35 < f0/fIII < 0.38$ where f0 represents the focal length of the entire lens system, fI represents the focal length of the 1$^{st}$ lens group, fII represents the focal length of the 2$^{nd}$ lens group, and fIII represents the focal length of the 3rd lens group.

Inequality (9) relates to the ratio of the focal length of the entire lens system to the focal length of the 1$^{st}$ lens group, which relates to the power of the 1$^{st}$ lens group. When the ratio is below the lower limit, the correction is not successful due to the overcorrection of astigmatism. When the ratio is above the upper limit, a back focus cannot be obtained.

Inequality (10) relates to the ratio of the focal length of the entire lens system to the focal length of the 2$^{nd}$ lens group, which relates to the power of the 2$^{nd}$ lens group. When the ratio is below the lower limit, the correction is not successful due to the overcorrection of astigmatism. When the ratio is above the upper limit, a back focus cannot be obtained.

Inequality (11) relates to the ratio of the focal length of the entire lens system to the focal length of the 3$^{rd}$ lens group, which relates to the power of the 3$^{rd}$ lens group. When the ratio is below the lower limit, the telecentric properties cannot be obtained. When the ratio is above the upper limit, coma aberration or astigmatism cannot be corrected.

Hereinafter, the present embodiment will be described by way of Example 11 with specific values.

Example 11

FIG. 21 is a configuration diagram of the projection lens according to Example 11 of Embodiment 4.

Example 11 is a projection lens having $F_{NO}=3.0$, a focal length f=10.47, and a half angle of view ω=44°. This example is designed for the purpose of having a long back focal length and telecentric properties, and correcting the magnification chromatic aberration and the distortion aberration by satisfying the relationships (9) to (11).

Table 11 shows specific values. The symbols in Table 11 represent the same as those in Table 1 of Example 1.

Figure 22:
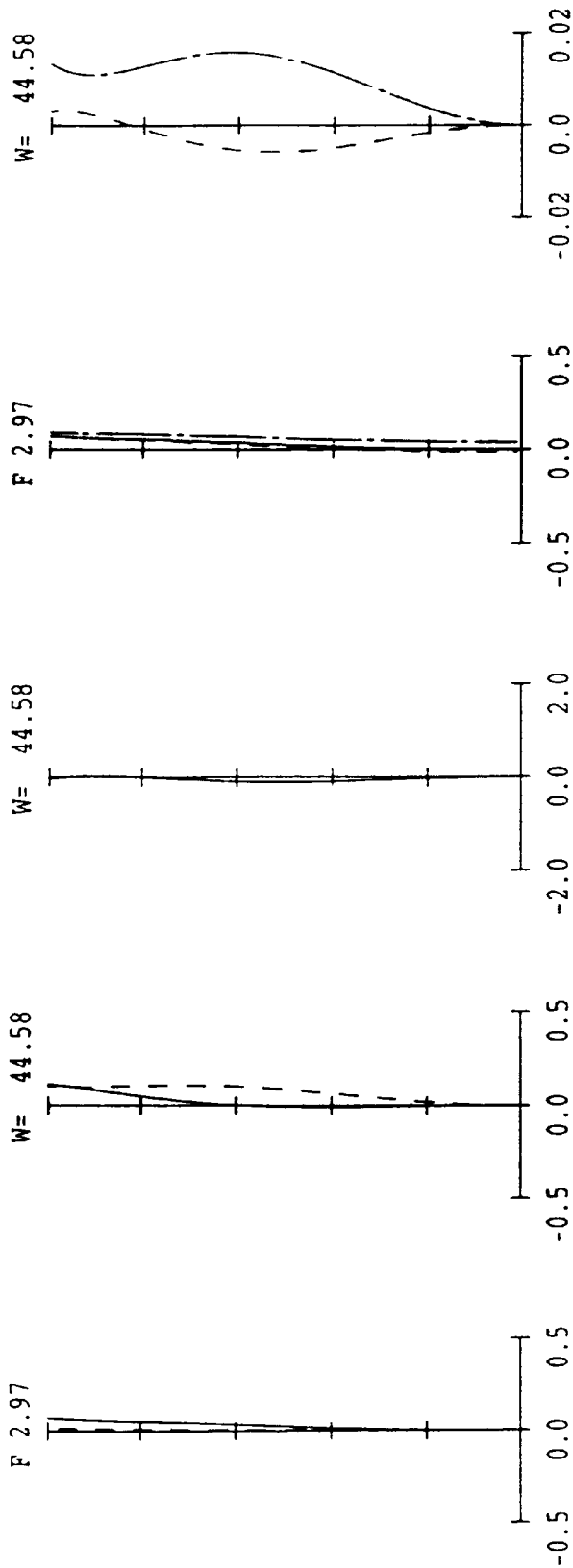
FIGS. 22a–22e is an aberration graph of the projection lens of Example 11.

FIGS. 22 (a), (b), (c), (d) and (e) show the spherical aberration (mm), astigmatism (mm), distortion aberration (%), axial chromatic aberration (mm) and magnification chromatic aberration (mm) of Example 11, respectively. The graphs in FIG. 22 are plotted in the same manner as in FIG. 2.

TABLE 11 f0 = 10.47, diameter ratio 1:3.0, ω =44°
f0/fI = -0.34
f0/fII = 0.05
f0/fIII = 0.36

| radius of curvature (mm) | distance between surfaces in axis direction (mm) | Nd | vd | PgF |
|---|---|---|---|---|
| r1 = 81.939 | d1 = 3.0 | n1 = 1.61800 | v1 = 63.39 | PgF1 = 0.5405 |
| r2 = 19.920 | d2 = 8.0 | | | |
| r3 = 85.000 | d3 = 3.0 | n2 = 1.61800 | v2 = 63.39 | PgF2 = 0.5405 |
| r4 = 26.404 | d4 = 6.0 | | | |
| r5 = -546.460 | d5 = 5.0 | n3 = 1.72825 | v3 = 28.32 | PgF3 = 0.6042 |
| r6 = -55.202 | d6 = 0.7 | | | |
| r7 = 42.166 | d7 = 4.5 | n4 = 1.49153 | v4 = 57.15 | PgF4 = 0.5430 |
| r8 = 29.003 | d8 = 19.3 | | | |
| r9 = 232.308 | d9 = 5.1 | n5 = 1.62004 | v5 = 36.60 | PgF5 = 0.5831 |
| r10 = -51.248 | d10 = 2.5 | n6 = 1.61800 | v6 = 63.39 | PgF6 = 0.5405 |
| r11 = 36.607 | d11 = 1.3 | | | |
| r12 = 27.949 | d12 = 4.5 | n7 = 1.49153 | v7 = 57.15 | PgF7 = 0.5405 |
| r13 = -535.292 | d13 = 14.0 | | | |
| r14 = 0.0 | d14 = 11.5 | | | |
| r15 = -104.493 | d15 = 2.0 | n8 = 1.72825 | v8 = 28.32 | PgF8 = 0.6042 |
| r16 = 51.323 | d16 = 7.2 | n9 = 1.49700 | v9 = 81.61 | PgF9 = 0.5387 |
| r17 = -20.307 | d17 = 0.7 | | | |
| r18 = -47.862 | d18 = 3.0 | n10 = 1.49153 | v10 = 57.15 | PgF10 = 0.5430 |
| r19 = -111.889 | d19 = 1.1 | | | |
| r20 = 157.013 | d20 = 9.0 | n11 = 1.49700 | v11 = 81.61 | PgF11 = 0.5387 |
| r21 = -20.701 | d21 = 5.0 | | | |
| r22 = 0.0 | d22 = 24.0 | n12 = 1.51680 | v12 = 64.20 | PgF12 = 0.5342 |
| r23 = 0.0 | d23 = 13.3 | | | |

The coefficients of the aspherical surfaces of the aspherical lenses are shown below.
The coefficient of the aspherical surface of the 8th surface:
a4 = -3.73898e-5
a6 = -3.89188e-8
a8 = -7.88803e-11
a10 = 3.53978e-13
The coefficient of the aspherical surface of the 13th surface:
a4 = 3.43331e-5
a6 = 2.13330e-7
a8 = -1.29478e-8
a10 = 3.25558e-10
The coefficient of the aspherical surface of the 18th surface:
a4 = -3.59321e-5
a6 = -5.87387e-8

TABLE 11-continued f0 = 10.47, diameter ratio 1:3.0, ω = 44°
f0/fI = −0.34
f0/fII = 0.05
f0/fIII = 0.36

| radius of curvature (mm) | distance between surfaces in axis direction (mm) | Nd | vd | PgF |
|---|---|---|---|---|
| a8 = 1.08756e-10 | | | | |
| a10 = −2.44805e-12 | | | | |
| The coefficient of the aspherical surface of the 19th surface: | | | | |
| a4 = 1.68760e-6 | | | | |
| a6 = 9.00341e-9 | | | | |
| a8 = 0.0 | | | | |
| a10 = 0.0 | | | | |

Embodiment 5

A projection lens according to Embodiment 5 of the present invention will be described with reference to the accompanying drawings.

Figure 23:
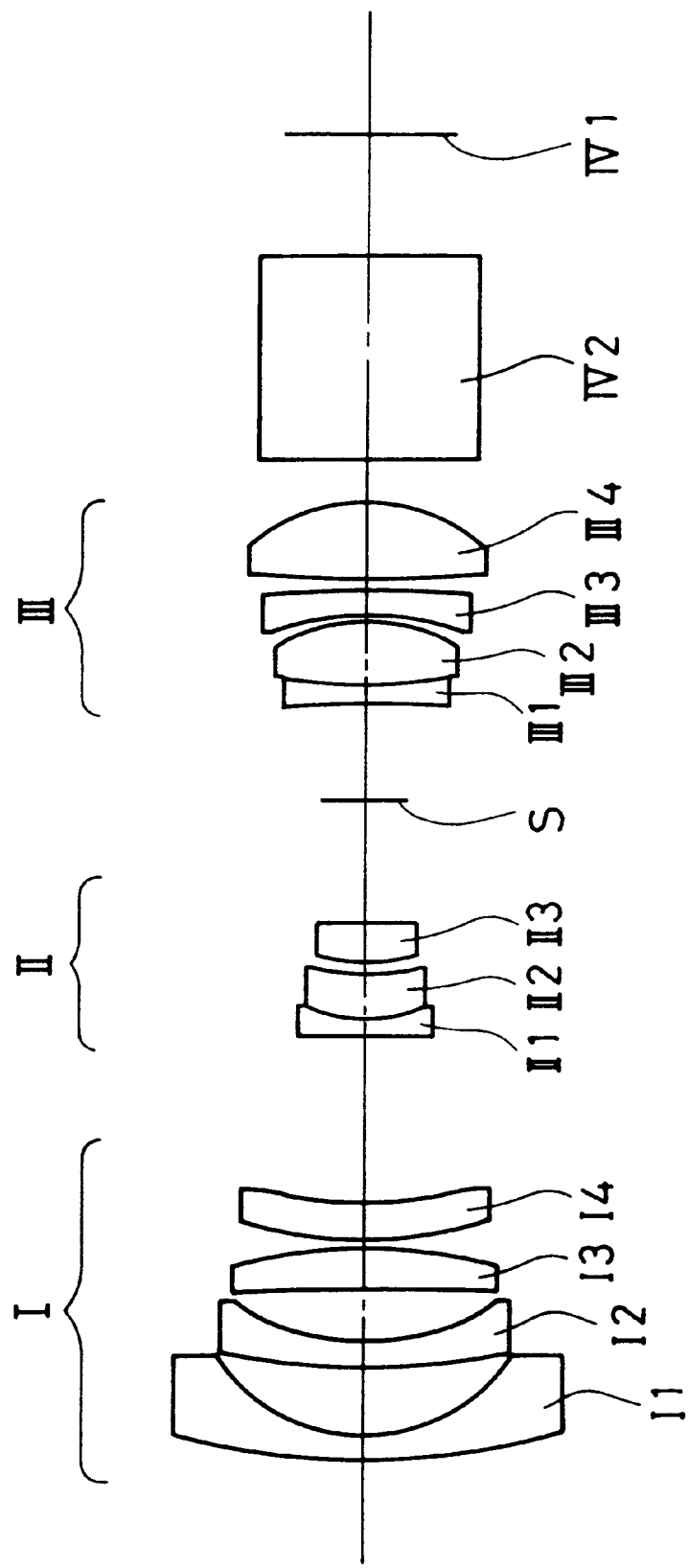
FIG. 23 is a configuration diagram of a projection lens according to Example 12 of Embodiment 5 of the present invention.

FIG. 23 is a configuration diagram of a projection lens according to Embodiment 5.

Referring to FIG. 23, a screen (not shown) is arranged on the left side of the drawing.

The It lens group I on the screen side has a strong negative power, so as to allow the axial ray to leap up significantly to ensure a back focus. Further, the $1^{st}$ lens group I advances the entrance pupil so that a large aperture efficiency can be achieved, and corrects the Petzval sum. The $1^{st}$ lens group I includes two negative lenses I1 and I2, a positive lens I3 for correction of chromatic aberration and distortion aberration, and an aspherical lens I4 for correction of distortion aberration in this order from the screen side.

The $2^{nd}$ lens group II has a weak power and corrects the magnification chromatic aberration. The $2^{nd}$ lens group II includes the first lens II1 to the third lens II3 in this order from the screen side. The first lens II1 of the $2^{nd}$ lens group II is a negative lens having a low refractive index and a large Abbe number. The second lens II2 of the $2^{nd}$ lens group II is a positive lens formed of glass having a small difference in the refractive index and a small difference in the Abbe number with respect to the first lens III. The first lens II1 and the second lens II2 are joined. It is preferable that the first lens II1 is formed of glass having an unusual partial dispersion, and that the first lens II1 and the second lens II2 have a small difference in the partial dispersion ratio. The third lens II3 of the $2^{nd}$ lens group II is a positive lens with an aspherical surface.

The $3^{rd}$ lens group III has a positive power and achieves telecentric properties. In the $3^{rd}$ lens group III, the principal ray is in a high position, so that a large distortion aberration is generated. For this reason, an aspherical lens is added to correct the distortion aberration. The $3^{rd}$ lens group III includes a negative lens III1 having a high refractive index and a small Abbe number, a positive lens III2 having a low refractive index and a large Abbe number, a negative lens III3 with an aspherical surface, and a positive lens III4 having a low refractive index and a large Abbe number in this order from the screen side. The negative lens III1 and the positive lens III2 are joined.

An aperture stop S is arranged between the $2^{nd}$ lens group II and the $3^{rd}$ lens group III.

Further, a spatial optical modulator IV1 is arranged on the side opposite to the screen of the $3^{rd}$ lens group III, and a prism IV2 is arranged between the spatial optical modulator IV1 and the lens groups.

In this manner, the prism IV2 intervenes between the spatial optical modulator IV1 and the projection lenses I to III, and therefore a long spatial gap is required between the spatial optical modulator IV1 and the lenses. In order words, a long back focal length is required. In addition, good telecentric properties are required to prevent non-uniformity in color or brightness due to the dependence on the angle of incidence from the prism IV2. According to the present embodiment, a long back focal length and telecentric properties are achieved with a wide angle of a half angle of view of 44°, and the distortion aberration and the magnification chromatic aberration are corrected successfully.

The projection lens of Embodiment 5 satisfies the following relationships (12) to (14):

(12) −0.35<f0/fI<−0.27
(13) 0.01<f0/fII<0.06
(14) 0.35<f0/fIII<0.38 where f0 represents the focal length of the entire lens system, fI represents the focal length of the $1^{st}$ lens group, fII represents the focal length of the $2^{nd}$ lens group, and fII represents the focal length of the $3^{rd}$ lens group.

Inequality (12) relates to the ratio of the focal length of the entire lens system to the focal length of the $1^{st}$ lens group, which relates to the power of the $1^{st}$ lens group. When the ratio is below the lower limit, the correction is not successful due to the overcorrection of astigmatism. When the ratio is above the upper limit, a back focus cannot be obtained.

Inequality (13) relates to the ratio of the focal length of the entire lens system to the focal length of the $2^{nd}$ lens group, which relates to the power of the $2^{nd}$ lens group. When the ratio is below the lower limit, the correction is not successful due to the overcorrection of astigmatism. When the ratio is above the upper limit, a back focus cannot be obtained.

Inequality (14) relates to the ratio of the focal length of the entire lens system to the focal length of the $3^{rd}$ lens group, which relates to the power of the $3^{rd}$ lens group. When the ratio is below the lower limit, the telecentric properties cannot be obtained. When the ratio is above the upper limit, coma aberration or astigmatism cannot be corrected.

Hereinafter, the present embodiment will be described by way of Example 12 with specific values.

Example 12

FIG. 23 is a configuration diagram of the projection lens according to Example 12 of Embodiment 5.

TABLE 12

$f0 = 10.36$, diameter ratio 1:3.0, $\omega = 44°$
$f0/fI = -0.34$
$f0/fII = 0.05$
$f0/fIII = 0.36$

| radius of curvature (mm) | distance between surfaces in axis direction (mm) | Nd | vd | PgF |
|---|---|---|---|---|
| r1 = 81.939 | d1 = 3.0 | n1 = 1.61800 | v1 = 63.39 | PgF1 = 0.5405 |
| r2 = 19.920 | d2 = 8.0 | | | |
| r3 = 85.000 | d3 = 3.0 | n2 = 1.61800 | v2 = 63.39 | PgF2 = 0.5405 |
| r4 = 26.404 | d4 = 6.0 | | | |
| r5 = −546.460 | d5 = 5.0 | n3 = 1.72825 | v3 = 28.32 | PgF3 = 0.6042 |
| r6 = −55.202 | d6 = 0.7 | | | |
| r7 = 42.166 | d7 = 4.5 | n4 = 1.49153 | v4 = 57.15 | PgF4 = 0.5430 |
| r8 = 29.003 | d8 = 19.3 | | | |
| r9 = 0.000 | d9 = 2.0 | n5 = 1.49700 | v5 = 81.61 | PgF5 = 0.5387 |
| r10 = 15.130 | d10 = 5.5 | n6 = 1.50137 | v6 = 56.46 | PgF6 = 0.5450 |
| r11 = 34.885 | d11 = 1.3 | | | |
| r12 = 27.949 | d12 = 4.5 | n7 = 1.49153 | v7 = 57.15 | PgF7 = 0.5405 |
| r13 = −535.292 | d13 = 14.0 | | | |
| r14 = 0.0 | d14 = 11.5 | | | |
| r15 = −104.493 | d15 = 2.0 | n8 = 1.72825 | v8 = 28.32 | PgF8 = 0.6042 |
| r16 = 51.323 | d16 = 7.2 | n9 = 1.49700 | v9 = 81.61 | PgF9 = 0.5387 |
| r17 = −20.307 | d17 = 0.7 | | | |
| r18 = −47.862 | d18 = 3.0 | n10 = 1.49153 | v10 = 57.15 | PgF10 = 0.5430 |
| r19 = −111.889 | d19 = 1.1 | | | |
| r20 = 157.013 | d20 = 9.0 | n11 = 1.49700 | v11 = 81.61 | PgF11 = 0.5387 |
| r21 = −20.701 | d21 = 5.0 | | | |
| r22 = 0.0 | d22 = 24.0 | n12 = 1.51680 | v12 = 64.20 | PgF12 = 0.5342 |
| r23 = 0.0 | d23 = 13.3 | | | |

The coefficients of the aspherical surfaces of the aspherical lenses are shown below.
The coefficient of the aspherical surface of the 8th surface:
$a4 = -3.73898e-5$
$a6 = -3.89188e-8$
$a8 = -7.88803e-11$
$a10 = 3.53978e-13$
The coefficient of the aspherical surface of the 13th surface:
$a4 = 3.43331e-5$
$a6 = 2.13330e-7$
$a8 = -1.29478e-8$
$a10 = 3.25558e-10$
The coefficient of the aspherical surface of the 18th surface:
$a4 = -3.59321e-5$
$a6 = -5.87387e-8$
$a8 = 1.08756e-10$
$a10 = -2.44805e-12$
The coefficient of the aspherical surface of the 19th surface:
$a4 = 1.68760e-6$
$a6 = 9.00341e-9$
$a8 = 0.0$
$a10 = 0.0$ Example 12 is a projection lens having $F_{NO}=3.0$, a focal length $f=10.36$, and a half angle of view $\omega=44°$. This example is designed for the purpose of having a long back focal length and telecentric properties, and correcting the magnification chromatic aberration and the distortion aberration by satisfying the relationships (12) to (14).

Table 12 shows specific values. The symbols in Table 12 represent the same as those in Table 1 of Example 1.

Figure 24:
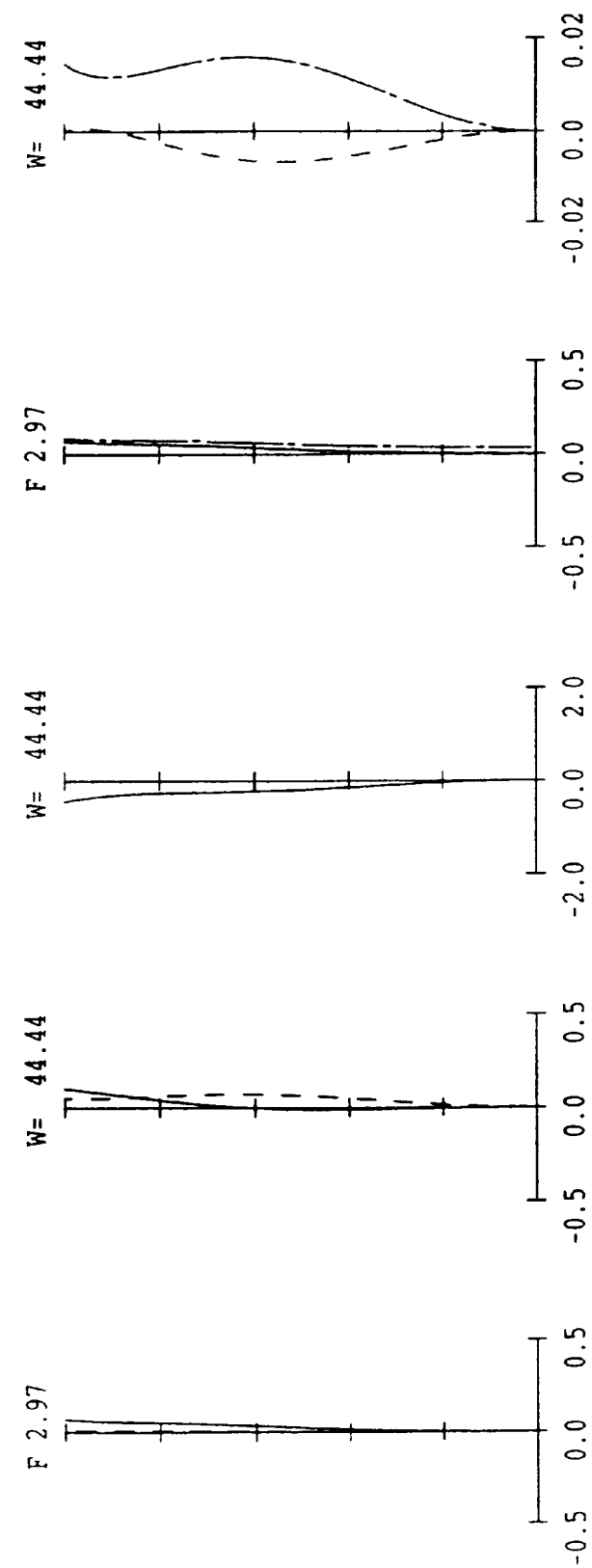
FIGS. 24a–24e is an aberration graph of the projection lens of Example 12.

FIGS. 24 (a), (b), (c), (d) and (e) show the spherical aberration (mm), astigmatism (mm), distortion aberration (%), axial chromatic aberration (mm) and magnification chromatic aberration (mm) of Example 12, respectively. The graphs in FIG. 24 are plotted in the same manner as in FIG. 2.

Embodiment 6

Figure 25:
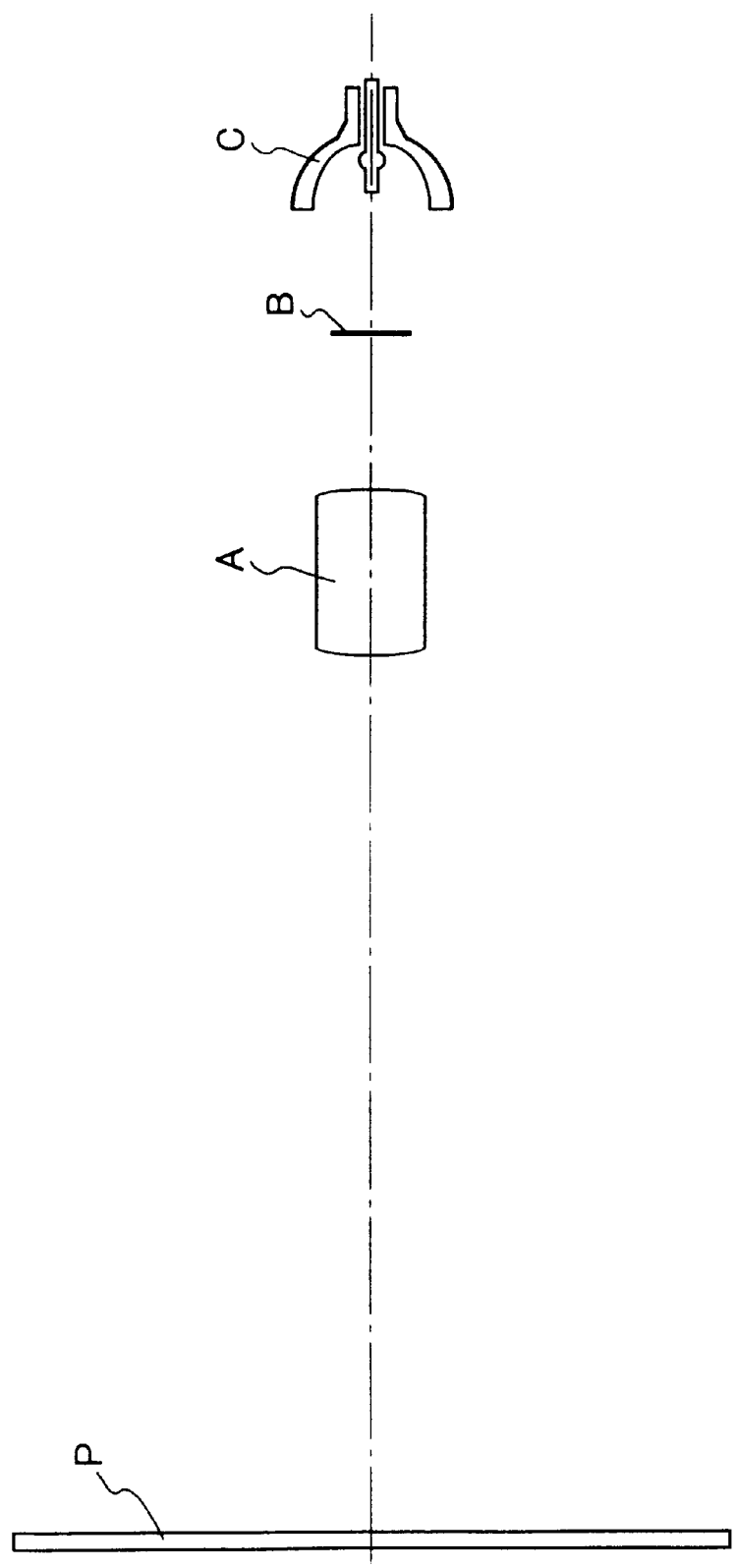
FIG. 25 is a configuration diagram of an image enlargement projection system according to Embodiment 6 of the present invention.

FIG. 25 is a configuration diagram of an image enlargement projection system according to Embodiment 6 of the present invention.

Referring to FIG. 25, the image enlargement projection system includes a projection lens A as shown in Embodiments 1 to 5, a spatial optical modulator B for forming an optical image, and a light source C. P is a focus surface for an image projected by the image enlargement projection system.

According to Embodiment 6, an optical image formed in the spatial optical modulator B illuminated by the light source C is projected in a larger size on the focus surface P by the projection lens A. The image enlargement projection system hardly creates bluring of colors by using the projection lenses shown in Embodiments 1 to 5 for the projection lens A.

Embodiment 7

Figure 26:
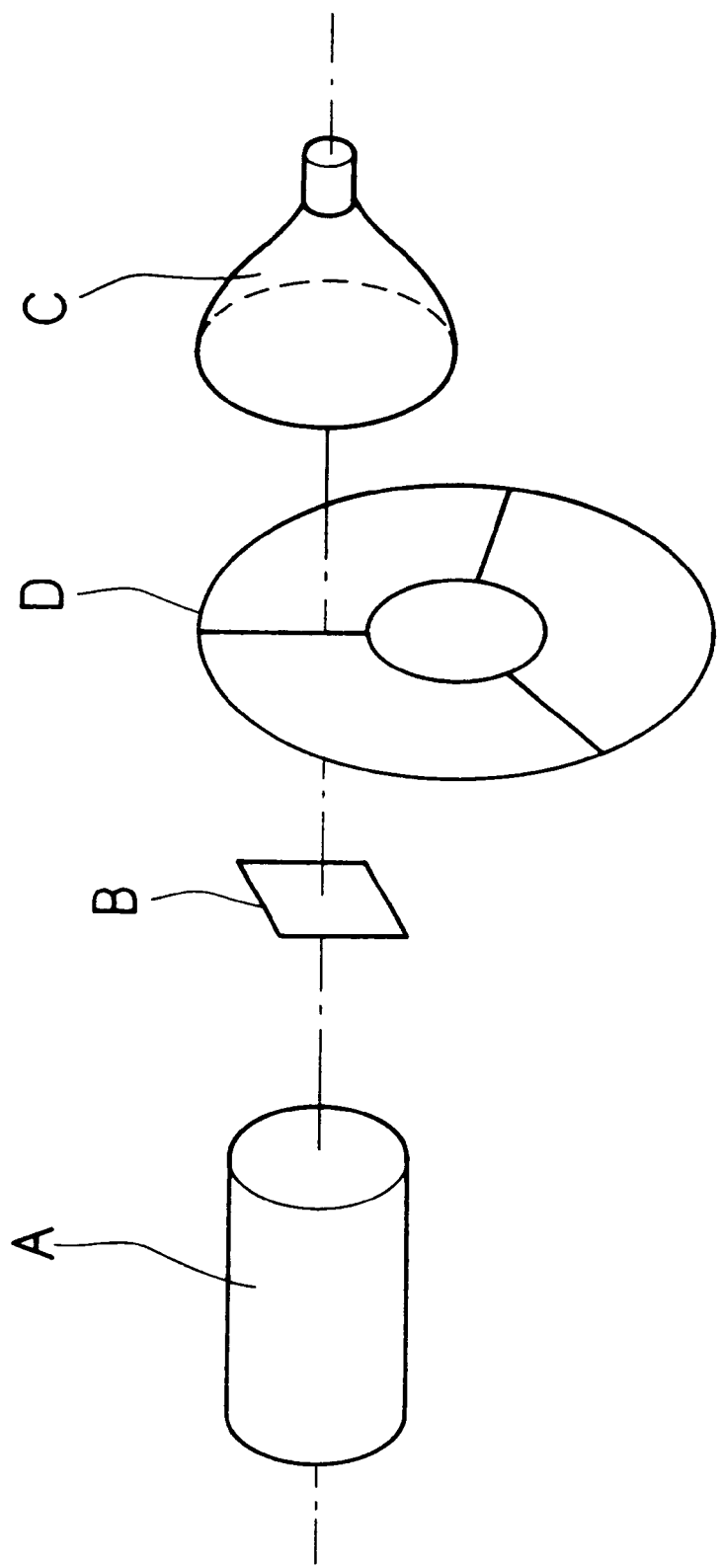
FIG. 26 is a configuration diagram of a video projector according to Embodiment 7 of the present invention.

FIG. 26 is a configuration diagram of a video projector according to Embodiment 7 of the present invention.

Referring to FIG. 26, the video projector includes a projection lens A as shown in Embodiments 1 to 5, a spatial optical modulator B for forming an optical image, and means D for temporally restricting light to three colors of blue, green and red. In the spatial optical modulator B, optical images corresponding to three types of light of blue, green and red are formed by temporal division. A filter in the means D is rotated so that light from the light source is restricted temporally and converted to three colors of blue, green and red, and thus the light is transmitted. The light from the light source C is resolved temporally into three colors of blue, green and red by the means D, and illuminates the spatial optical modulator B. In the spatial optical modulator B, optical images of blue, green and red are formed by temporal division in response to the means D, and projected in a larger size by the projection lens A.

The video projector provides bright images with a small level of blurring of colors and distortion by using the projection lenses shown in Embodiments 1 to 5 for the projection lens A.

Embodiment 8

Figure 27:
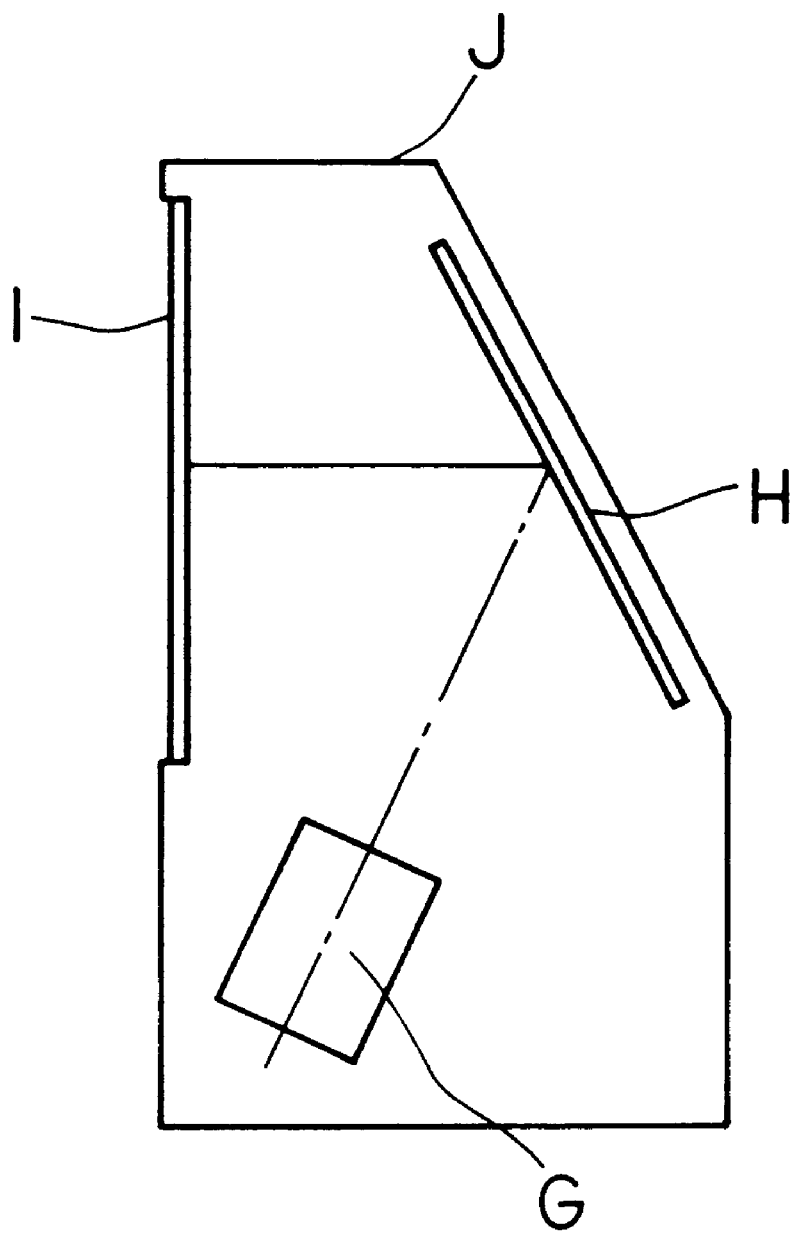
FIG. 27 is a configuration diagram of a rear projector according to Embodiment 8 of the present invention.

FIG. 27 is a configuration diagram of a rear projector according to Embodiment 8 of the present invention.

Referring to FIG. 27, the rear projector includes the video projector G shown in Embodiment 7, a mirror H for bending light, a transmission type screen I, and a housing J. An image projected from the video projector G is reflected by the mirror H, and the image is formed on the transmission type screen I.

According to Embodiment 8, the depth and the height of the set can be reduced by using the video projector shown in Embodiment 7 for the video projector G, so that a compact set can be achieved.

Embodiment 9

Figure 28:
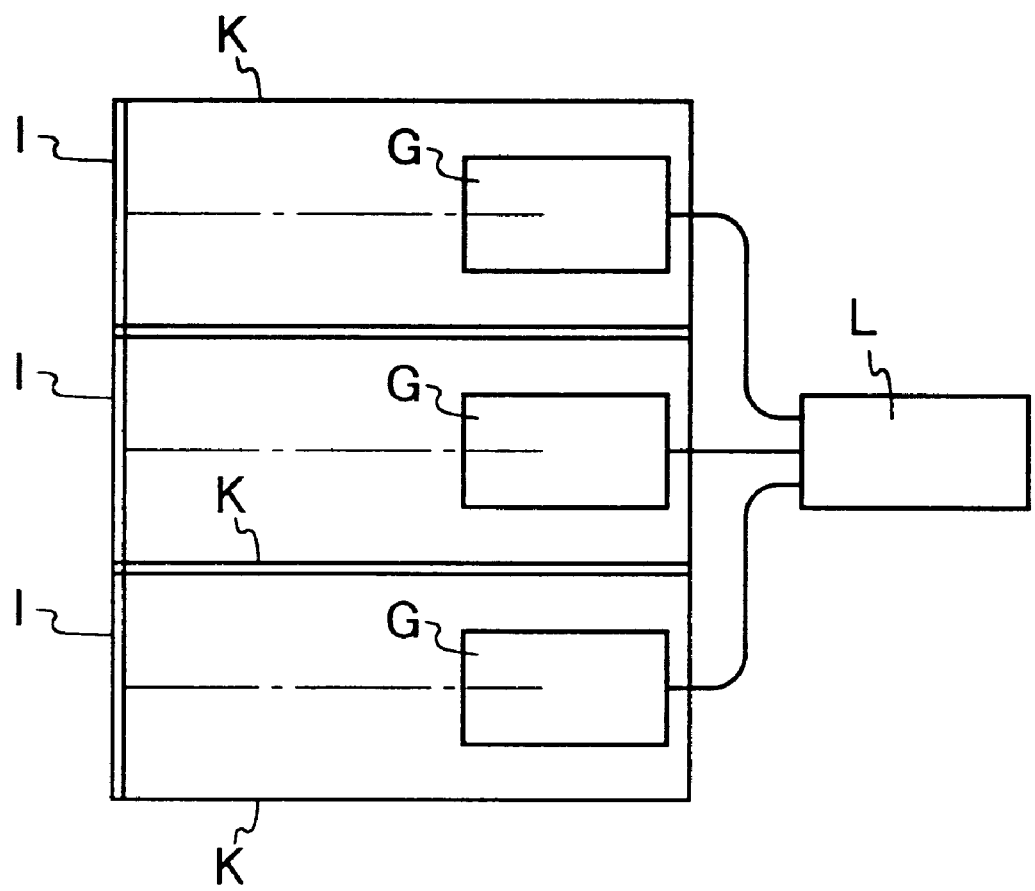
FIG. 28 is a configuration diagram of a multivision system according to Embodiment 9 of the present invention.

FIG. 28 is a configuration diagram of a multi-vision system according to Embodiment 9 of the present invention.

Referring to FIG. 28, the multi-vision system includes the video projectors G shown in Embodiment 7, transmission type screens I, housings K and an image dividing circuit L for dividing an image. The image signals are processed and divided by the image division circuit L and supplied to the plurality of video projectors G. The images projected from the video projectors G are formed on the transmission type screen I.

According to Embodiment 9, a compact set with a small depth can be achieved by using the video projector shown in Embodiment 7 for the video projector G.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A projection lens for projecting light from a light source onto a screen to form a magnified image, comprising two joined lenses, each of which includes a negative lens and a positive lens, and satisfying the following requirements:

(1) $-0.04 < ndI1 - ndI2 < -0.003$
(2) $13.9 < vdI1 - vdI2 < 31$
(3) $-0.039 < ndII1 - ndII2 < 0.001$
(4) $0.8 < vdII1 - vdII2 < 11.5$
(5) $-0.033 < PgFII1 - PgFII2 < 0.009$ where $ndI1$ represents a refractive index of the negative lens of the first joined lens;
$ndI2$ represents a refractive index of the positive lens of the first joined lens;
$vdI1$ represents an Abbe number of the negative lens of the first joined lens;
$vdI2$ represents an Abbe number of the positive lens of the first joined lens;
$ndII1$ represents a refractive index of the positive lens of the second joined lens;
$ndII2$ represents a refractive index of the negative lens of the second joined lens;
$vdII1$ represents an Abbe number of the positive lens of the second joined lens;
$vdII2$ represents an Abbe number of the negative lens of the second joined lens;
$PgFII1$ represents a partial dispersion ratio $(ng-nF)/(nF-nC)$ with respect to a g-line and an F-line of the positive lens of the second joined lens; and
$PgFII2$ represents a partial dispersion ratio $(ng-nF)/(nF-nC)$ with respect to a g-line and an F-line of the negative lens of the second joined lens.

2. The projection lens according to claim 1, wherein no lens is present on an optical axis between the two joined lenses.

3. The projection lens according to claim 1, wherein a projection magnification for projecting an optical image illuminated by a light source onto a screen is a factor of 10 to 300.

4. The projection lens according to claim 1, wherein an aperture stop is provided on a side of the projection lens opposite to the screen.

5. A projection lens comprising aim lens group with a negative power a $2^{nd}$ lens group with a weak power, and a $3^{rd}$ lens group with a positive power in this order from a screen side, wherein an aperture stop is provided between the $2^{nd}$ lens group and the $3^{rd}$ lens group, and
the $2^{nd}$ lens group is the projection lens according to claim 1.

6. The projection lens according to claim 5, satisfying the following requirements:

(6) $-0.35 < f0/fI < -0.27$
(7) $0.01 < f0/fII < 0.06$
(8) $0.35 < f0/fIII < 0.38$ where fI, fII and fIII represent focal lengths of the $1^{st}$, $2^{nd}$, and $3^{rd}$ lens groups, respectively, and f0 represents a focal length of the entire lens system.

7. The projection lens according to claim 5, wherein each of the $1^{st}$, $2^{nd}$ and $3^{rd}$ lens groups has at least one aspherical surface.

8. The projection lens according to claim 5, which constitutes an exit-side telecentric system.

9. The projection lens according to claim 5, wherein an F number is not more than 3, and a half angle of view is not less than 40°.

10. A projection lens comprising a $1^{st}$ lens group with a weak power and a $2^{nd}$ lens group with a positive power in this order from a screen side, wherein an aperture stop is provided between the $1^{st}$ lens group and the $2^{nd}$ lens group, and the $1^{st}$ lens group is the projection lens according to claim 1.

11. A projection lens, which constitutes an optical system with an aperture stop back, wherein the projection lens according to claim 1 is arranged on a screen side of the aperture stop.

12. A projection lens comprising a $1^{st}$ lens group with a negative power, a $2^{nd}$ lens group with a weak power, and a $3^{rd}$ lens group with a positive power in this order from a screen side, wherein an aperture stop is provided between the $2^{nd}$ lens group and the $_3$rd lens group, and the $2^{nd}$ lens group includes a first lens with a positive power, a second lens with a negative power, and a third lens with a positive power and an aspherical surface in this order from the screen side, the first lens of the $2^{nd}$ lens group and the second lens of the $2^{nd}$ lens group are joined, and the following requirements are satisfied:

(9) $-0.35 < f0/fI < 0.27$

(10) $0.01 < f0/fII < 0.06$

(11) $0.35 < f0/fIII < 0.38$ where f0 represents a focal length of the entire lens system;
fI represents a focal length of the $1^{st}$ lens group;
fII represents a focal length of the $2^{nd}$ lens group; and
fIII represents a focal length of the $3^{rd}$ lens group.

13. A projection lens comprising a $1^{st}$ lens group with a negative power, a $2^{nd}$ lens group with a weak power, and a $3^{rd}$ lens group with a positive power in this order from a screen side, wherein an aperture stop is provided between the $2^{nd}$ lens group and the $3^{rd}$ lens group, and the 2nd lens group includes a first lens with a negative power, a second lens with a positive power, and a third lens with a positive power and an aspherical surface in this order from the screen side, the first lens of the $2^{nd}$ lens group and the second lens of the $2^{nd}$ lens group are joined, and the following requirements are satisfied:

(12) $-0.35 < f0/fI < -0.27$

(13) $0.01 < f0/fII < 0.06$

(14) $0.35 < f0/fIII < 0.38$ where f0 represents a focal length of the entire lens system;
fI represents a focal length of the let lens group;
fII represents a focal length of the 2nd lens group; and
fIII represents a focal length of the $3^{rd}$ lens group.

14. The projection lens according to claim 12 or 13, wherein each of the $1^{st}$, $2^{nd}$ and $3^{rd}$ lens groups has at least one aspherical surface.

15. The projection lens according to claim 12 or 13, wherein an F number is not more than 3, and a half angle of view is not less than 40°.

16. An image enlargement projection system comprising a light source, a spatial optical modulator for forming an optical image while being illuminated by light radiated from the light source, and projecting means for projecting the optical image of the spatial light modulator, wherein the projecting means comprises the projection lens according to any one of claims 1, 12 or 13.

17. A video projector comprising a light source, means for temporally restricting light from the light source to three colors of blue, green and red, a spatial optical modulator for forming optical images corresponding to the three color of blue, green and red that are changed temporally while being illuminated by light radiated from the light source, and projecting means for projecting the optical image in the spatial light modulator, wherein the projecting means comprises the projection lens according to any one of claims 1, 12 or 13.

18. A rear projector comprising the video projector according to claim 17, a mirror for bending light projected from a projection lens, and a transmission type screen for showing an image formed from the projected light.

19. A multi-vision system comprising a plurality of systems and an image dividing circuit for dividing an image, each of the plurality of systems including the video projector according to claim 17, a transmission type screen for showing an image formed from the projected light and a housing.

* * * * *